(12) United States Patent
Mann et al.

(10) Patent No.: US 11,465,243 B2
(45) Date of Patent: Oct. 11, 2022

(54) INTERLAYERED STRUCTURES FOR JOINING DISSIMILAR MATERIALS AND METHODS FOR JOINING DISSIMILAR METALS

(71) Applicant: The Boeing Company, Chicago, IL (US)

(72) Inventors: Austin E. Mann, St. Louis, MO (US); Ali Yousefiani, Tustin, CA (US)

(73) Assignee: The Boeing Company, Chicago, IL (US)

( * ) Notice: Subject to any disclaimer, the term of this patent is extended or adjusted under 35 U.S.C. 154(b) by 241 days.

(21) Appl. No.: 16/007,425

(22) Filed: Jun. 13, 2018

(65) Prior Publication Data

US 2019/0134755 A1 May 9, 2019

Related U.S. Application Data

(63) Continuation-in-part of application No. 15/804,061, filed on Nov. 6, 2017.

(51) Int. Cl.
*B32B 15/00* (2006.01)
*B23K 35/00* (2006.01)
(Continued)

(52) U.S. Cl.
CPC ............ *B23K 35/002* (2013.01); *B22F 7/008* (2013.01); *B23K 20/12* (2013.01); *B23K 20/227* (2013.01);
(Continued)

(58) Field of Classification Search
None
See application file for complete search history.

(56) References Cited

U.S. PATENT DOCUMENTS 4,674,675 A 6/1987 Mietrach
8,882,442 B2 * 11/2014 Smarsly ............. B23K 20/1205
415/12
(Continued)

FOREIGN PATENT DOCUMENTS

CN 101722356 6/2010
CN 103192195 7/2013
(Continued)

OTHER PUBLICATIONS

Ambroziak, "Friction Welding of Dissimilar Metal Joints with Intermediate Layer", Apr. 2007, Journal of Achievements in Materials and Manufacturing Engineering, vol. 21, Issue 2, p. 37-40. (Year: 2007).*
(Continued)

*Primary Examiner* — Seth Dumbris
*Assistant Examiner* — Kim S. Horger
(74) *Attorney, Agent, or Firm* — Walters & Wasylyna LLC

(57) ABSTRACT

An interlayered structure for joining of dissimilar materials, includes a first material substrate, a second material substrate having a composition dissimilar from a composition of the first material substrate, and a plurality of interlayers disposed between the first material substrate and the second material substrate, including a first interlayer nearest to the first material substrate and a last interlayer nearest to the second material substrate. The first interlayer has a composition selected to have a maximum solid solubility within the composition of the first material substrate that is greater than or equal to the other interlayers' solubility within the composition of the first material substrate. The last interlayer has a composition selected to have a maximum solid solubility within the composition of the second material substrate that is greater than or equal to the other interlayers' solubility
(Continued)

within the composition of the second material substrate. At least one of the plurality of interlayers is a sintered powder interlayer.

20 Claims, 19 Drawing Sheets

(51) Int. Cl.
*B22F 7/00* (2006.01)
*B23K 20/12* (2006.01)
*B23K 20/227* (2006.01)
*B32B 15/01* (2006.01)
*B23K 103/24* (2006.01)

(52) U.S. Cl.
CPC ........ *B23K 35/004* (2013.01); *B22F 2301/15* (2013.01); *B22F 2301/35* (2013.01); *B22F 2301/40* (2013.01); *B23K 2103/24* (2018.08); *B32B 15/01* (2013.01)

(56) References Cited

U.S. PATENT DOCUMENTS

| | | | |
|---|---|---|---|
| 2009/0269497 A1* | 10/2009 | Yousefiani | C23C 28/028 427/258 |
| 2010/0124669 A1* | 5/2010 | Lee | B23K 20/023 428/660 |
| 2018/0161931 A1* | 6/2018 | Li | B23K 26/0006 |

FOREIGN PATENT DOCUMENTS

| | | |
|---|---|---|
| CN | 105216394 | 1/2016 |
| CN | 107127454 | 9/2017 |
| EP | 0 590 197 | 4/1994 |
| JP | S56-74390 | 6/1981 |
| JP | 1-241375 | 9/1989 |
| JP | H01-241375 | 9/1989 |

OTHER PUBLICATIONS

Wei et al., "Fabrication and characterization of a functionally graded material from Ti—6Al—4V to SS316 by laser metal deposition," *Additive Manufacturing*, vol. 14, pp. 95-104 (2017).
Pardal et al., "Dissimilar metal joining of stainless steel and titanium using copper as transition metal," *Int. J. Adv. Manuf. Technol.*, vol. 86, pp. 1139-1150 (2016).
Shiue et al., "Infrared Brazing of Ti—6Al—4V and 17-4 PH Stainless Steel with a Nickel Barrier Layer," *Metallurgical and Materials Transactions A*, vol. 37A (2006).
European Patent Office, "Communication," App. No. 18194464.6 (dated Apr. 8, 2019).
European Patent Office, Patent abstract of JP H01-241375.
European Patent Office, Patent abstract of JP S56-74390.
European Patent Office, "Communication pursuant to Article 94(3) EPC," App. No. 18 194 464.6 (dated Nov. 22, 2019).
European Patent Office, "Communication pursuant to Article 94(3) EPC," with translation of document JP-H01241375-A, App. No. 18 194 464.6 (dated Apr. 23, 2019).
European Patent Office, "Communication pursuant to Article 94(3) EPC," App. No. 18 194 464.6 (dated Jul. 24, 2020).
China National Intellectual Property Administration, Office Action, with English translation, App. No. 201811298401.4 (dated Aug. 23, 2021).

* cited by examiner

INTERLAYERED STRUCTURES FOR JOINING DISSIMILAR MATERIALS AND METHODS FOR JOINING DISSIMILAR METALS

PRIORITY

This application is a continuation-in-part of U.S. Ser. No. 15/804,061 filed on Nov. 6, 2017.

FIELD

The present description relates to the field of joining dissimilar materials, in particular joining titanium-based components with iron-based components by friction welding.

BACKGROUND

There has been increased interest in joining dissimilar materials to produce compositionally graded structures. However, joining dissimilar materials involves many challenges, including metallurgical incompatibility between the dissimilar materials.

Titanium-based alloys are often considered for use because of their excellent mechanical and metallurgical properties, and there has been increased interest in joining titanium-based alloys with dissimilar materials, such as stainless steels, which have excellent weldability and are more inexpensive than titanium-based alloys. Traditionally, titanium-based alloys and iron-based alloys (e.g. steels) are difficult to join. Most joining and welding techniques involve some kind of thermal input to create the energy necessary for a proper bond. However, this energy input enables the formation of deleterious phases that significantly hinder the stability and strength of the interface between the two dissimilar metals. This makes it a challenge to design airframe structures that take advantage of both the titanium and steel systems, while meeting design criteria for the joint.

Accordingly, those skilled in the art continue with research and development in the field of joining dissimilar materials, in particular joining titanium-based components with iron-based components.

SUMMARY

In one embodiment, an interlayered structure for joining of dissimilar materials, includes: a first material substrate; a second material substrate having a composition dissimilar from a composition of the first material substrate; and a plurality of interlayers disposed between the first material substrate and the second material substrate, including a first interlayer nearest to the first material substrate and a last interlayer nearest to the second material substrate, wherein the first interlayer has a composition selected to have a maximum solid solubility within the composition of the first material substrate that is greater than or equal to the other interlayers' solubility within the composition of the first material substrate, wherein the last interlayer has a composition selected to have a maximum solid solubility within the composition of the second material substrate that is greater than or equal to the other interlayers' solubility within the composition of the second material substrate, and wherein at least one of the plurality of interlayers is a sintered powder interlayer.

In another embodiment, an interlayered structure for joining of titanium-based components with iron-based components, includes: a first metal substrate comprising titanium; a second metal substrate comprising iron; a first interlayer disposed between the first metal substrate and the second metal substrate, the first interlayer comprising at least one of molybdenum and vanadium; and a second interlayer disposed between the first interlayer and the second metal substrate, the second interlayer comprising at least one of chromium and nickel, wherein at least one of the first interlayer and the second interlayer is a sintered powder interlayer.

In yet another embodiment, a method for joining dissimilar metals, includes: providing an interlayered structure, comprising: a first metal substrate; a second metal substrate having a composition dissimilar from a composition of the first metal substrate; and a plurality of interlayers disposed between the first metal substrate and the second metal substrate, including a first interlayer nearest to the first metal substrate and a last interlayer nearest to the second metal substrate, wherein the first interlayer has a composition selected to have a maximum solid solubility within the composition of the first material substrate that is greater than or equal to the other interlayers within the composition of the first material substrate, wherein the last interlayer has a composition selected to have a maximum solid solubility within the composition of the second material substrate that is greater than or equal to the other interlayers within the composition of the second material substrate, and wherein at least one of the plurality of interlayers is a sintered powder interlayer; and joining the first metal substrate and a second metal substrate by heat of friction derived from relative movement between the first metal substrate and the second metal substrate.

Other embodiments of the disclosed interlayered structures for joining dissimilar materials and methods for joining dissimilar metals will become apparent from the following detailed description, the accompanying drawings and the appended claims.

DETAILED DESCRIPTION

Figure 1:
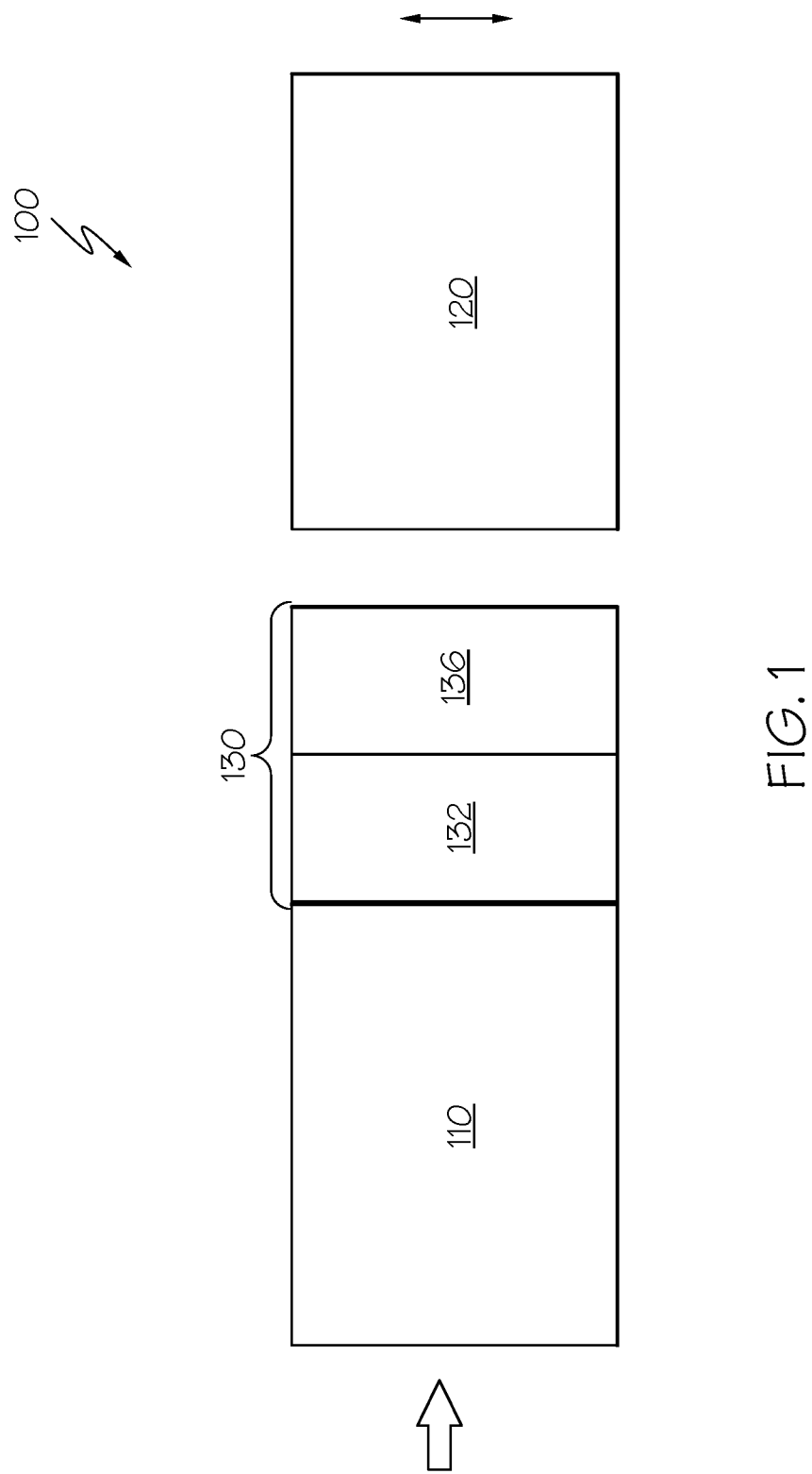
FIG. 1 is a side view of an exemplary interlayered structure for joining dissimilar materials according to an embodiment of the present description.

FIG. 1 illustrates an exemplary interlayered structure 100 for joining dissimilar materials, including a first material substrate 110, a second material substrate 120 having a composition dissimilar from a composition of the first material substrate, and a plurality of interlayers 130 disposed between the first material substrate and the second material substrate. The plurality of interlayers includes a first interlayer 132 nearest to the first material substrate, and a last interlayer 136 nearest to the second material substrate. In an aspect, one or more of the plurality of interlayers is a sintered powder interlayer. In another aspect, all of the plurality of interlayers are sintered powder interlayers.

Figure 2:
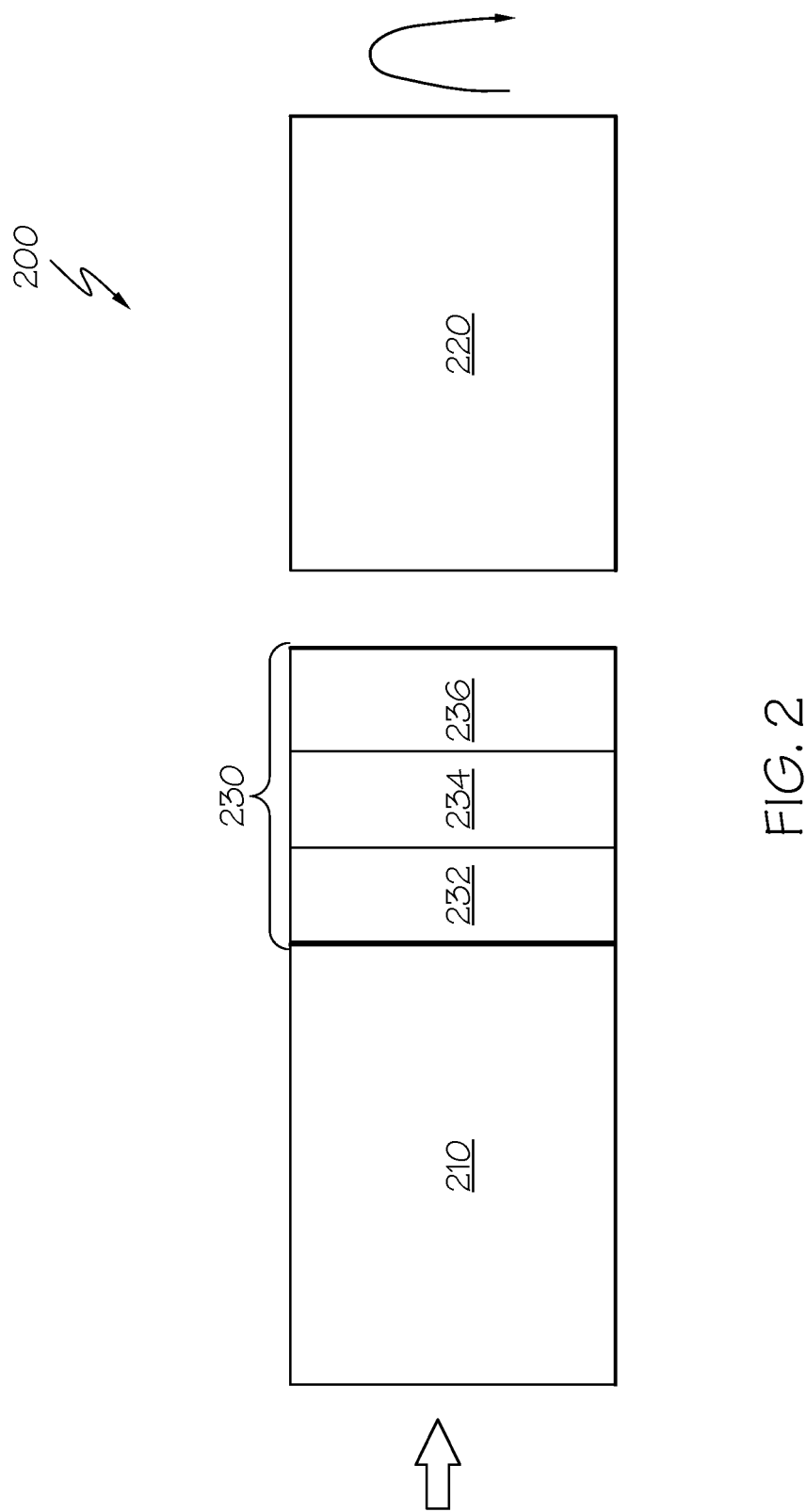
FIG. 2 is a side view of another exemplary interlayered structure for joining dissimilar materials according to an embodiment of the present description.

FIG. 2 illustrates another exemplary interlayered structure 200 for joining dissimilar materials, including a first material substrate 210, a second material substrate 220 having a composition dissimilar from a composition of the first material substrate, and a plurality of interlayers 230 disposed between the first material substrate and the second material substrate. The plurality of interlayers includes a first interlayer 232 nearest to the first material substrate, a last interlayer 236 nearest to the second material substrate, and a second interlayer 234 between the first interlayer and the last interlayer. In another example, the plurality of interlayers includes a third interlayer between the second interlayer and the last interlayer. In yet another example, the plurality of interlayers includes a fourth interlayer between the third interlayer and the last interlayer, etc.

In the examples shown in FIGS. 1 and 2, the plurality of interlayers have been illustrated as being disposed on the first material substrate. In another example, the plurality of interlayers may be disposed on the second material substrate. In yet another example, one or more of the plurality of interlayers may be disposed on the first material substrate, and a remaining of the plurality of interlayers may be disposed on the second material substrate.

In the present description, the interlayers facilitate joining the first material substrate and the second material substrate by friction welding, not to be confused with friction stir welding.

Friction welding is a known joining process that generates heat through mechanical friction between workpieces in relative motion (e.g. linear oscillation as shown in FIG. 1 or rotational as shown in FIG. 2) to one another, with the addition of a lateral force (as shown in FIGS. 1 and 2) to displace and fuse the workpieces. In contrast to friction welding, friction stir welding utilizes an external pin tool to perform the mechanical mixing of materials. Therefore, it is less feasible that the interlayered structure of the present description would be utilized in friction stir welding.

An advantage of friction welding is that it allows dissimilar materials to be joined. However, direct friction welding of dissimilar materials still results in the formation of deleterious phases that significantly hinder the stability and strength of the interface between the two dissimilar metals. Accordingly, the present description positions a plurality of interlayers between the first material substrate and the second material substrate.

Figure 3:
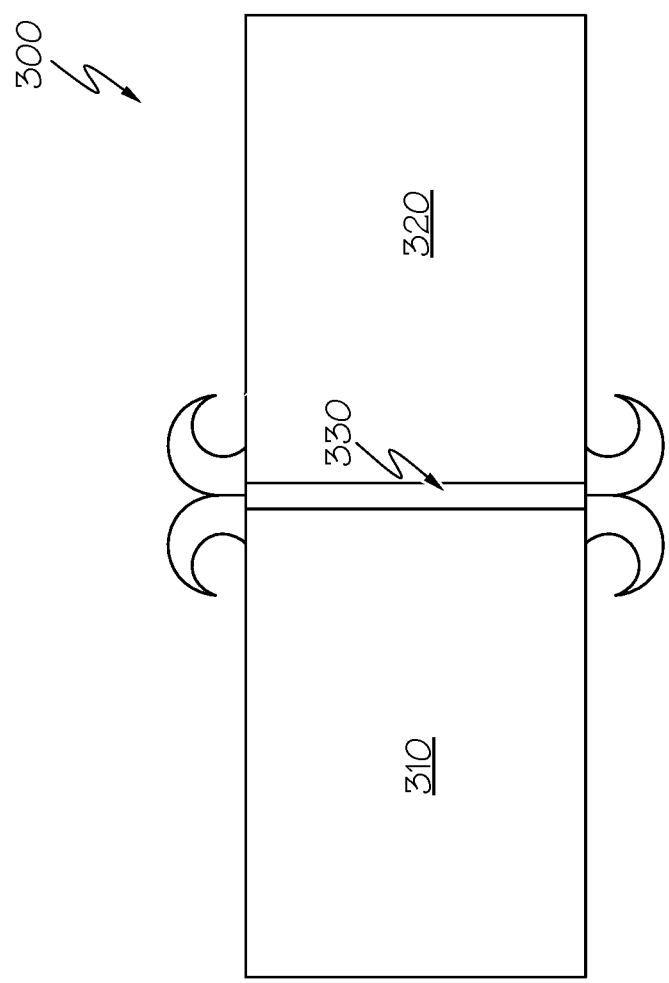
FIG. 3 is a side view of an exemplary joined structure after joining the exemplary interlayered structure of FIG. 1 or FIG. 2.

FIG. 3 illustrates a joined structure after friction welding of an interlayer structure of the present description. As shown, the joined structure 300 includes a first material substrate 310 corresponding to first material substrate 110 or 210 and a second material substrate 320 corresponding to second material substrate 120 or 220. During friction welding, an amount of material will be forced out as flash, and an amount of the plurality of interlayers 130, 230 will remain in the joined structure as an intermixed remnant interlayer 330. Thus, the interlayers provide a sacrificial layer that is consumed during friction welding of the first material substrate and the second material substrate. The friction welding may yield an intermixed remnant layer after flash ejection of at least 0.0001 inch, such as at least 0.001 inch disposed between the first material substrate and the second material substrate.

In the present description, the compositions of the plurality of interlayers are selected to prevent or minimize the formation of deleterious phases at the interface between the two dissimilar metals.

In one aspect, the first interlayer 132, 232 has a composition selected to have a maximum solid solubility within the composition of the first material substrate 110, 210 that is greater than or equal to the other interlayers within the composition of the first material substrate 110, 210, and wherein the last interlayer 136, 236 has a composition selected to have a maximum solid solubility within the composition of the second material substrate 120, 220 that is greater than or equal to the other interlayers within the composition of the second material substrate 120, 220.

In another aspect, the first interlayer 132, 232 has a composition selected to have a maximum solid solubility within the composition of the first material substrate 110, 210 that is greater than the last interlayer 136, 236 within the composition of the first material substrate 110, 210, and wherein the last interlayer 136, 236 has a composition selected to have a maximum solid solubility within the composition of the second material substrate 120, 220 that is greater than the first interlayer 132, 232 within the composition of the second material substrate 120, 220.

In another aspect, the plurality of interlayers includes a second interlayer 134 between the first interlayer 132 and the last interlayer 136, wherein the second interlayer 134 has a composition selected to have a maximum solid solubility within the composition of the first material substrate 110 that is greater than the last interlayer 136 within the composition of the first material substrate 110 and to have a maximum solid solubility within the composition of the second material substrate 120 that is greater than the first interlayer 132 within the composition of the second material substrate 120.

By way of selecting the compositions of the plurality of interlayers, the maximum solid solubilities of the interlayers within the first material substrate and within the second material substrate may be controlled to prevent or minimize the formation of deleterious phases at the interface between the first material substrate and the second material substrate.

In the present description, the term "maximum solid solubility" refers to the highest (by atomic percent basis) equilibrium solid solubility of the solid solute component within the respective solid solvent component at any temperature from room temperature to the melting temperature. For example, if a solid solute component is completely soluble at equilibrium within the respective solid solvent component at an elevated temperature, then the maximum solid solubility would be 100%. If a solid solute component is soluble up to 15 atomic percent within the respective solid solvent component at an elevated temperature but only up to 5 atomic percent within the respective solid solvent component at room temperature, then the maximum solid solubility would be 15%.

In the present description, the dimensions of the first material substrate and the second material substrate, such as length, width, and height, are not dependent on the dimensions of the interlayers, and are not dependent on the upset distance, which is an independent process control variable.

In the present description, the thicknesses of the interlayers are selected to prevent or minimize the formation of deleterious phases at the interface between the two dissimilar metals.

Returning to FIG. 3, during friction welding, an amount of material will be forced out as flash, the amount of which corresponds to an upset distance between the first material substrate and the second material substrate. In addition to accounting for the upset distance, diffusion of materials occurs at a small distance across the interface due to heat generated from mechanical friction between the first material substrate and the second material substrate.

Thus, a total thickness of the plurality of interlayers is selected to be greater than the upset distance between the first material substrate and the second material substrate plus a width of the diffusion zone of materials across the interface between the first material substrate and the second material substrate. The upset distance is determined as a parameter of the friction welding process, and the width of the diffusion zone may be determined by empirical measurement of a diffusion zone of prior experimental results. In consideration of these factors, the plurality of interlayers may have a total thickness of at least 0.01 inch, such as at least 0.5 inch.

However, it is undesirable to further increase the total thickness of the plurality of interlayers beyond that which is necessary to prevent or minimize the formation of deleterious phases. Accordingly, in an aspect, the plurality of interlayers may have a total thickness of at most 1.0 inch, such as at most 0.5 inch.

Furthermore, the plurality of interlayers may intermix with each other during friction welding. Therefore, each of the interlayers may have a thickness of at least 0.001 inch, such as at least 0.01 inch. Also, compositions of the non-adjacent interlayers may be selected to prevent or minimize the formation of deleterious phases as a result of such intermixing.

The plurality of interlayers may be disposed onto the first material substrate and/or the second material substrate by any suitable method. In an example, the plurality of interlayers may be disposed onto the first material substrate and/or the second material substrate by a deposition process, such as thermal spray processes and additive manufacturing processes. In another example, the plurality of interlayers may be disposed onto the first material substrate and/or the second material substrate by a powder metallurgy process as referenced below starting at FIG. 15A.

In the following embodiments of the present description, an interlayered structure for joining titanium-based components with iron-based components includes: a first metal substrate comprising titanium; a second metal substrate comprising iron; a first interlayer disposed between the first metal substrate and the second metal substrate, the first interlayer comprising at least one of molybdenum and vanadium; and a second interlayer disposed between the first interlayer and the second metal substrate, the second interlayer comprising at least one of chromium and nickel.

In an aspect, the first interlayer or the second interlayer is a sintered powder interlayer. In another aspect, the first interlayer and the second interlayer are sintered powder interlayers.

In an aspect, the first metal substrate comprises a titanium-based alloy. In another aspect, the second metal substrate comprises an iron-based alloy, such as steel, in particular stainless steel.

In an aspect, the first interlayer comprises molybdenum. For example, the first interlayer consists of molybdenum and up to 5% of other elements.

In another aspect, the first interlayer comprises vanadium. For example, the first interlayer consists of vanadium and up to 5% of other elements.

In yet another aspect, the first interlayer comprises molybdenum and vanadium. For example, the first interlayer consists of molybdenum, vanadium and up to 5% of other elements.

Figure 4:
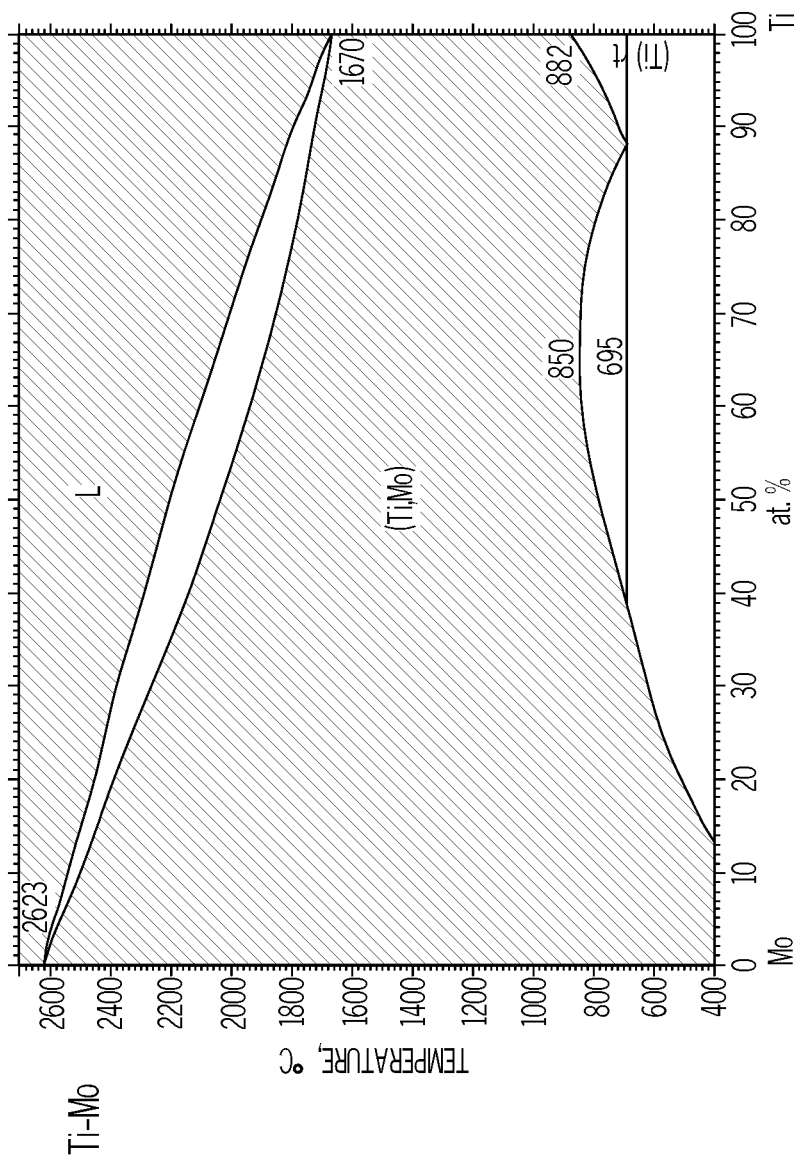
FIG. 4 is a binary phase diagram of the titanium-molybdenum system.
Figure 5:
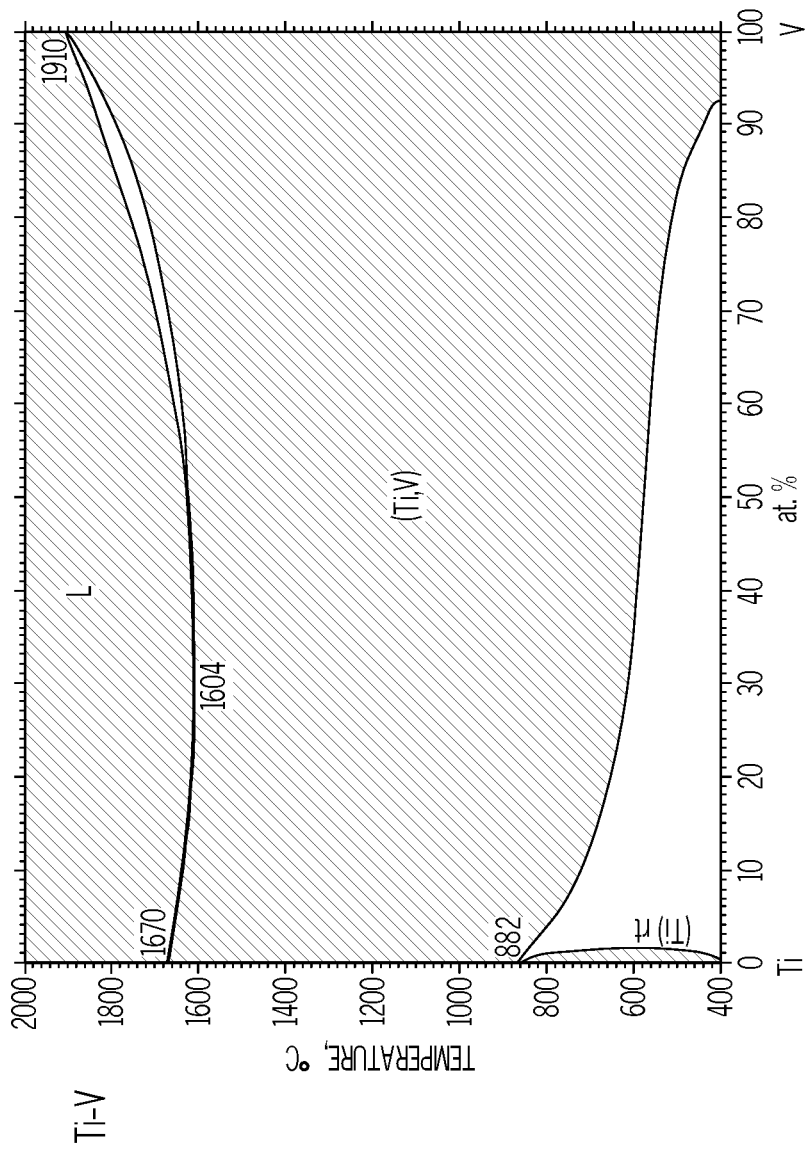
FIG. 5 is a binary phase diagram of the titanium-vanadium system.

FIG. 4 is the titanium-molybdenum binary phase diagram, showing complete (i.e. 100%) solid solubility of molybdenum in titanium at elevated temperatures. FIG. 5 is the titanium-vanadium binary phase diagram, showing complete (i.e. 100%) solid solubility of vanadium in titanium at elevated temperatures.

By way of selecting the first interlayer to comprise molybdenum and/or vanadium, the formation of deleterious phases at the interface between the first metal substrate comprising titanium and the first interlayer can be prevented or minimized.

In an aspect, the second interlayer comprises chromium. For example, the second interlayer consists of chromium and up to 5% of other elements.

In another aspect, the second interlayer comprises nickel. For example, the second interlayer consists of nickel and up to 5% of other elements.

In yet another aspect, the second interlayer comprises chromium and nickel. For example, the second interlayer consists of chromium, nickel and up to 5% of other elements.

Figure 6:
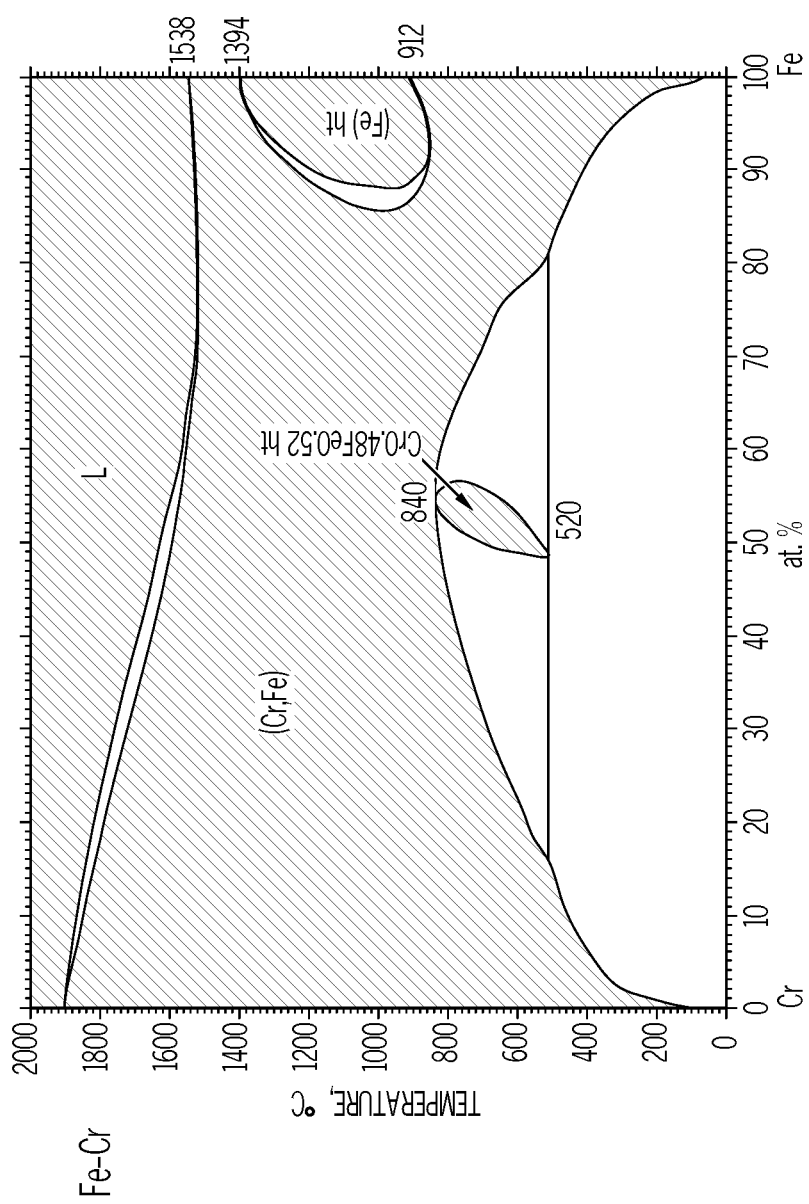
FIG. 6 is a binary phase diagram of the iron-chromium system.
Figure 7:
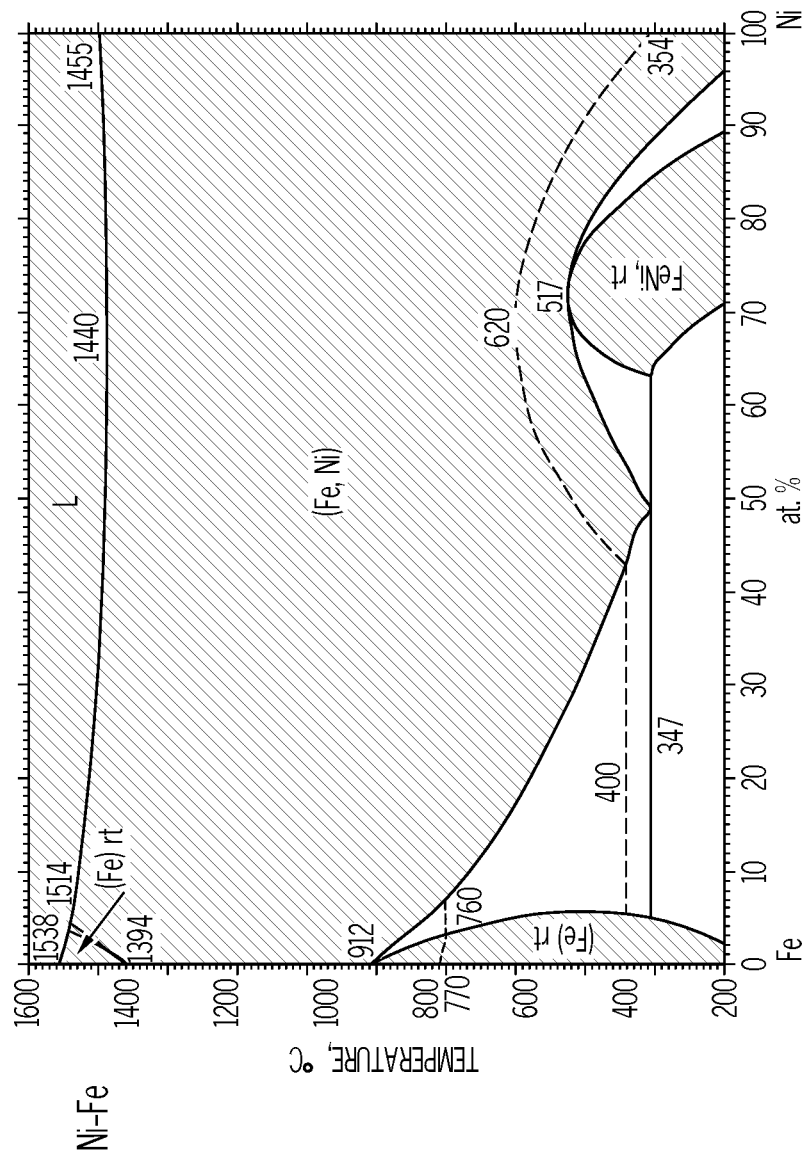
FIG. 7 is a binary phase diagram of the nickel-iron system.

FIG. 6 is the iron-chromium binary phase diagram, showing complete (i.e. 100%) solid solubility of chromium in iron at elevated temperatures. FIG. 7 is the nickel-iron binary phase diagram, showing complete (i.e. 100%) solid solubility of nickel in iron at elevated temperatures.

By way of selecting the second interlayer to comprise chromium and/or nickel, the formation of deleterious phases at the interface between the second metal substrate comprising iron and the second interlayer can be prevented or minimized.

In an aspect, the first interlayer has a thickness of at least 0.001 inch, such as at least 0.01 inch. In another aspect, the second interlayer has a thickness of at least 0.001 inch, such as at least 0.01 inch.

In an aspect, the first interlayer and the second interlayer may be disposed on the first metal substrate. The first interlayer may be disposed directly on the first metal substrate, and the second interlayer may be disposed directly on the first interlayer.

In another aspect, the first interlayer and the second interlayer may be disposed on the second metal substrate. The second interlayer may be disposed directly on the second metal substrate, and the first interlayer may be disposed directly on the second interlayer.

Figure 8:
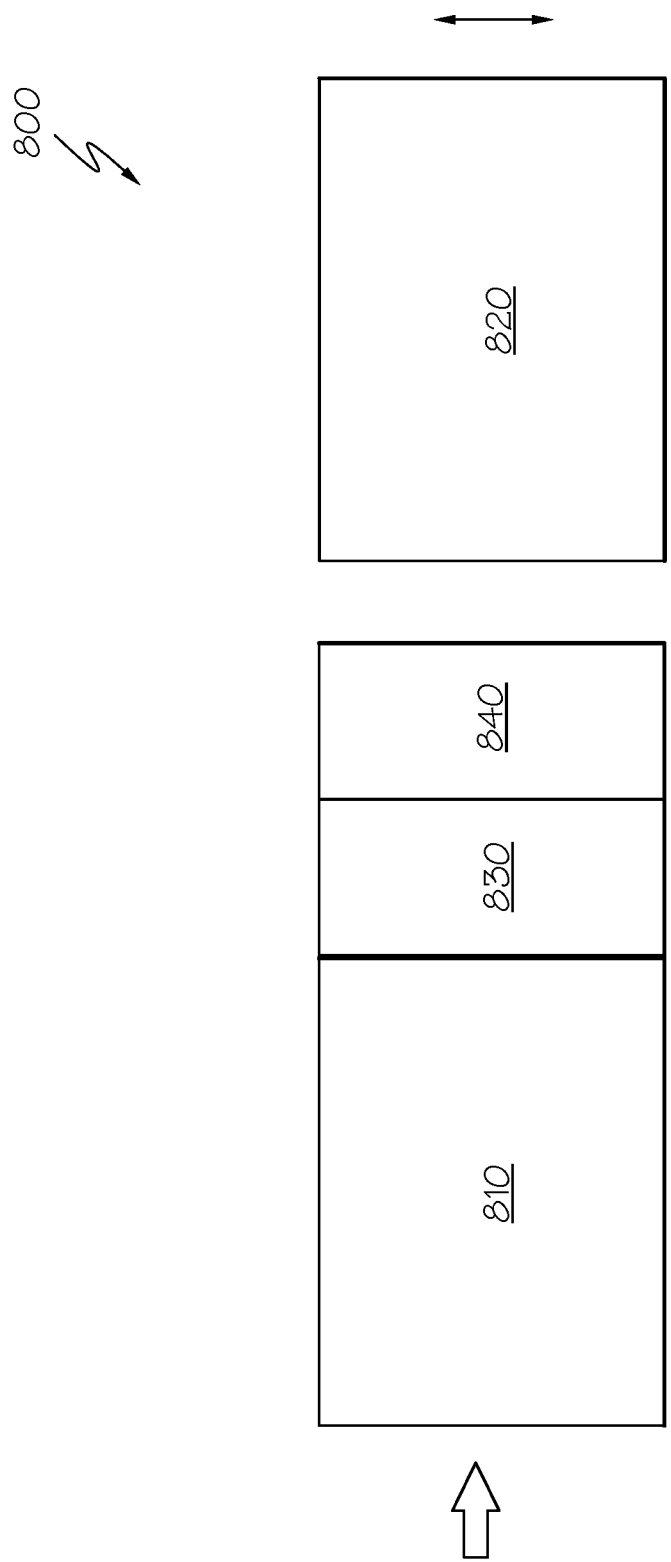
FIG. 8 is a side view of an exemplary interlayered structure for joining titanium-based components with iron-based components according to an embodiment of the present description.

FIG. 8 illustrates an exemplary interlayered structure 800 for joining titanium-based components with iron-based components. The interlayered structure 800 includes: a first metal substrate 810 comprising a titanium-based alloy; a second metal substrate 820 comprising an iron-based alloy; a first interlayer 830 disposed between the first metal substrate and the second metal substrate, the first interlayer comprising molybdenum; and a second interlayer 840 disposed between the first interlayer and the second metal substrate, the second interlayer comprising chromium. By way of selecting the first interlayer to comprise molybdenum and the second interlayer to comprise chromium, the formation of deleterious phases at the interface between the first metal substrate and the second metal substrate can be prevented or minimized. In this exemplary embodiment, the first interlayer comprises molybdenum and is disposed directly on the titanium of the first metal substrate, and the second interlayer comprises chromium and is disposed directly on the first interlayer that comprises molybdenum. The first interlayer has a selected composition comprising molybdenum, which has a maximum solid solubility within the first material substrate comprising the titanium-based alloy that is greater than or equal to the solubility of the other interlayer (comprising chromium) within the first material substrate comprising the titanium-based alloy. Likewise, the second interlayer (or last interlayer) has a selected composition comprising chromium, which has a maximum solid solubility within the composition of the second material substrate comprising the iron-based alloy that is greater than or equal to the solubility of the other interlayer (comprising molybdenum) within the second material substrate comprising the iron-based alloy. Although the first interlayer and the second interlayer are shown as being disposed on the first metal substrate, the first interlayer and the second interlayer may alternatively be disposed on the second metal substrate, or the first interlayer may be disposed on the first metal substrate and the second interlayer may be disposed in the second metal substrate.

Figure 9:
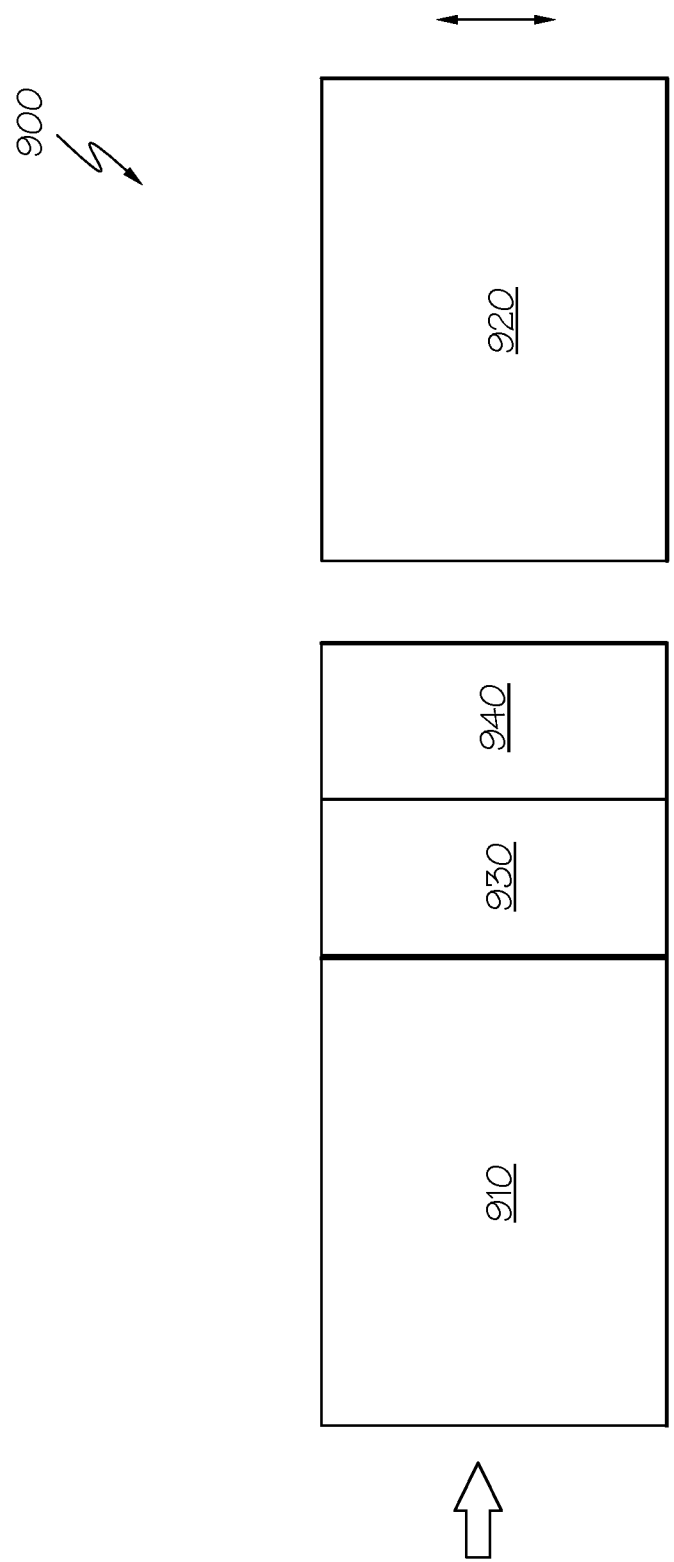
FIG. 9 is a side view of another exemplary interlayered structure for joining titanium-based components with iron-based components according to an embodiment of the present description.

FIG. 9 illustrates an exemplary interlayered structure 900 for joining titanium-based components with iron-based components. The interlayered structure 900 includes: a first metal substrate 910 comprising a titanium-based alloy; a second metal substrate 920 comprising an iron-based alloy; a first interlayer 930 disposed between the first metal substrate and the second metal substrate, the first interlayer comprising vanadium; and a second interlayer 940 disposed between the first interlayer and the second metal substrate, the second interlayer comprising chromium. By way of selecting the first interlayer to comprise vanadium and the second interlayer to comprise chromium, the formation of deleterious phases at the interface between the first metal substrate and the second metal substrate can be prevented or minimized. In this exemplary embodiment, the first interlayer comprises vanadium and is disposed directly on the titanium of the first metal substrate, and the second interlayer comprises chromium and is disposed directly on the first interlayer that comprises vanadium. The first interlayer has a selected composition comprising vanadium, which has a maximum solid solubility within the first material substrate comprising the titanium-based alloy that is greater than or equal to the solubility of the other interlayer (comprising chromium) within the first material substrate comprising the titanium-based alloy. Likewise, the second interlayer (or last interlayer) has a selected composition comprising chromium, which has a maximum solid solubility within the composition of the second material substrate comprising the iron-based alloy that is greater than or equal to the solubility of the other interlayer (comprising vanadium) within the second material substrate comprising an iron-based alloy. Although the first interlayer and the second interlayer are shown as being disposed on the first metal substrate, the first interlayer and the second interlayer may alternatively be disposed on the second metal substrate, or the first interlayer may be disposed on the first metal substrate and the second interlayer may be disposed in the second metal substrate.

In the following embodiments of the present description, an interlayered structure for joining titanium-based components with iron-based components includes: a first metal substrate comprising titanium; a second metal substrate comprising iron; a first interlayer disposed between the first metal substrate and the second metal substrate, the first interlayer comprising at least one of molybdenum and vanadium; a second interlayer disposed between the first interlayer and the second metal substrate, the second interlayer comprising at least one of chromium and nickel; and a third interlayer disposed between the second interlayer and the second metal substrate, the third interlayer comprising iron.

In an aspect, one or more of the first, second, and third interlayers is a sintered powder interlayer. In another aspect, all of the first, second, and third interlayers are sintered powder interlayers.

In an aspect, the first metal substrate comprises a titanium-based alloy. In another aspect, the second metal substrate comprises an iron-based alloy, such as steel, in particular stainless steel.

In an aspect, the first interlayer comprises molybdenum. For example, the first interlayer consists of molybdenum and up to 5% of other elements.

In another aspect, the first interlayer comprises vanadium. For example, the first interlayer consists of vanadium and up to 5% of other elements.

In yet another aspect, the first interlayer comprises molybdenum and vanadium. For example, the first interlayer consists of molybdenum, vanadium and up to 5% of other elements.

In an aspect, the second interlayer comprises chromium. For example, the second interlayer consists of chromium and up to 5% of other elements.

In another aspect, the second interlayer comprises nickel. For example, the second interlayer consists of nickel and up to 5% of other elements.

In yet another aspect, the second interlayer comprises chromium and nickel. For example, the second interlayer consists of chromium, nickel and up to 5% of other elements.

In an aspect, the third interlayer consists of nickel and up to 5% of other elements.

In an aspect, the first interlayer has a thickness of at least 0.001 inch, such as at least 0.01 inch. In another aspect, the second interlayer has a thickness of at least 0.001 inch, such as at least 0.01 inch. In yet another aspect, the third interlayer may have a thickness of at least 0.001 inch.

In an aspect, first interlayer, the second interlayer, and the third interlayer may be disposed on the first metal substrate. The first interlayer may be disposed directly on the first metal substrate, the second interlayer may be disposed directly on the first interlayer, and the third interlayer may be disposed directly on the second interlayer.

In another aspect, the first interlayer, the second interlayer, and the third interlayer may be disposed on the second metal substrate. The third interlayer may be disposed directly on the first metal substrate, the second interlayer may be disposed directly on the third interlayer, and the first interlayer may be disposed directly on the second interlayer.

Figure 10:
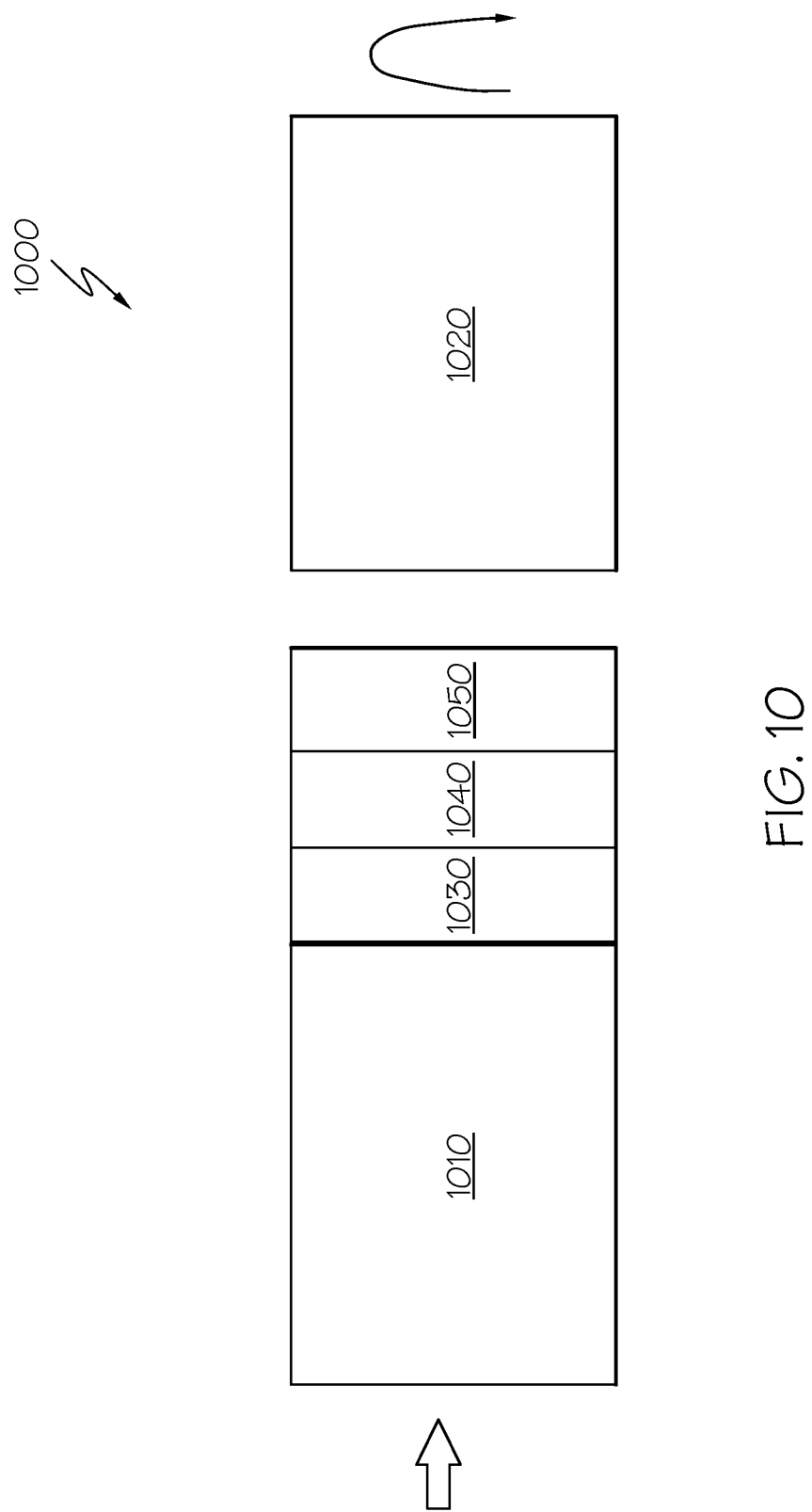
FIG. 10 is a side view of yet another exemplary interlayered structure for joining titanium-based components with iron-based components according to an embodiment of the present description.

FIG. 10 illustrates an exemplary interlayered structure 1000 for joining titanium-based components with iron-based components. The interlayered structure 1000 includes: a first metal substrate 1010 comprising a titanium-based alloy; a second metal substrate 1020 comprising an iron-based alloy; a first interlayer 1030 disposed between the first metal substrate and the second metal substrate, the first interlayer comprising molybdenum; a second interlayer 1040 disposed between the first interlayer and the second metal substrate, the second interlayer comprising chromium; and a third interlayer 1050 comprising iron, the third interlayer disposed between the second interlayer and the second metal substrate. By way of selecting the first interlayer to comprise molybdenum, the second interlayer to comprise chromium, and the third interlayer to comprise iron, the formation of deleterious phases at the interface between the first metal substrate and the second metal substrate can be prevented or minimized. In this exemplary embodiment, the first interlayer comprises molybdenum and is disposed directly on the titanium of the first metal substrate, the second interlayer comprises chromium and is disposed directly on the first interlayer that comprises molybdenum, and the third interlayer comprises iron and is disposed on the second interlayer that comprises chromium. The first interlayer has a selected composition comprising molybdenum, which has a maximum solid solubility within the first material substrate comprising the titanium-based alloy that is greater than or equal to the solubility of the other interlayers (comprising chromium and iron) within the first material substrate comprising the titanium-based alloy. Likewise, the third interlayer (or last interlayer) has a selected composition comprising iron, which has a maximum solid solubility within the composition of the second material substrate comprising the iron-based alloy that is greater than or equal to the solubility of the other interlayers (comprising molybdenum and chromium) within the second material substrate comprising the iron-based alloy. Although the first interlayer, the second interlayer, and the third interlayer are shown as being disposed on the first metal substrate, the first interlayer, the second interlayer, and the third interlayer may alternatively be disposed on the second metal substrate, or the interlayers may be disposed on both the first metal substrate and the second metal substrate in various permutations.

Figure 11:
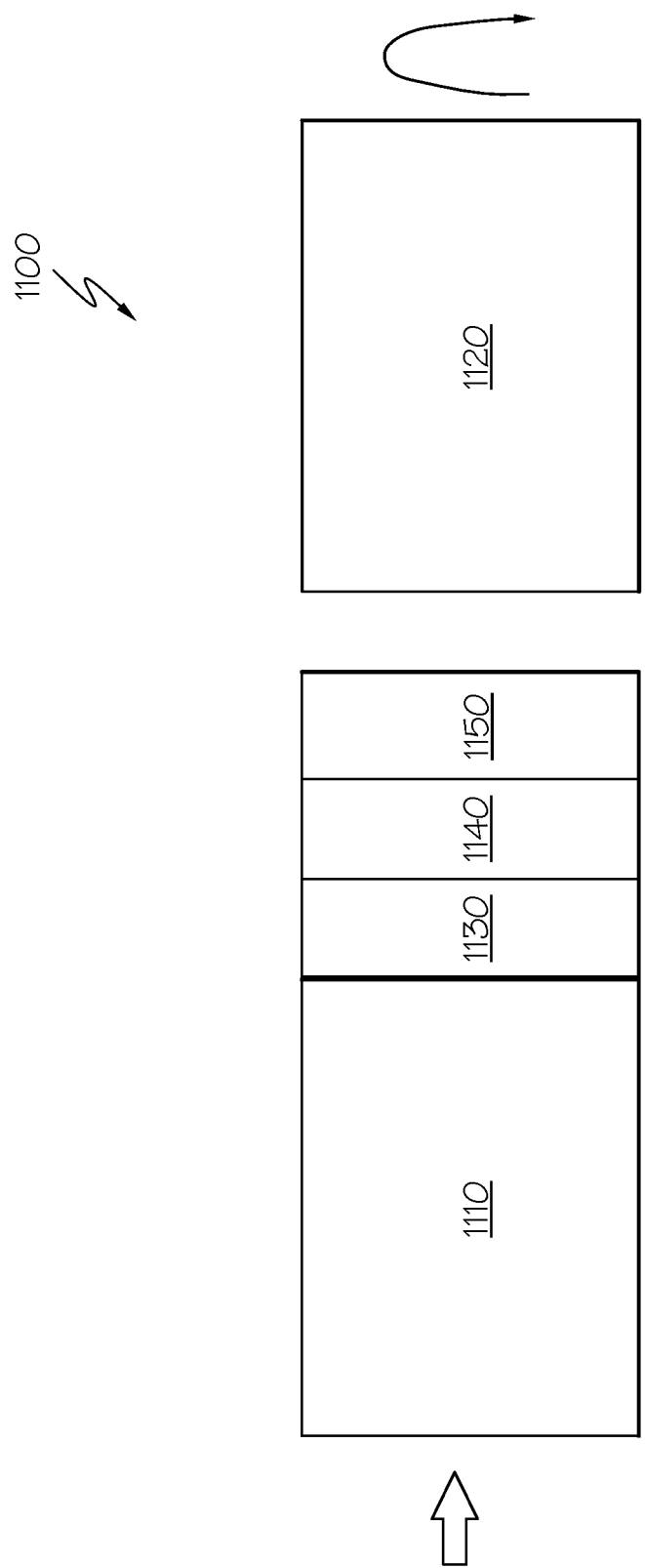
FIG. 11 is a side view of yet another exemplary interlayered structure for joining titanium-based components with iron-based components according to an embodiment of the present description.

FIG. 11 illustrates an exemplary interlayered structure 1100 for joining titanium-based components with iron-based components. The interlayered structure 1100 includes: a first metal substrate 1110 comprising a titanium-based alloy; a second metal substrate 1120 comprising an iron-based alloy; a first interlayer 1130 disposed between the first metal substrate and the second metal substrate, the first interlayer comprising molybdenum; a second interlayer 1140 disposed between the first interlayer and the second metal substrate, the second interlayer comprising nickel; and a third interlayer 1150 comprising iron, the third interlayer disposed between the second interlayer and the second metal substrate. By way of selecting the first interlayer to comprise molybdenum, the second interlayer to comprise nickel, and the third interlayer to comprise iron, the formation of deleterious phases at the interface between the first metal substrate and the second metal substrate can be prevented or minimized. In this exemplary embodiment, the first interlayer comprises molybdenum and is disposed directly on the titanium of the first metal substrate, the second interlayer comprises nickel and is disposed directly on the first interlayer that comprises molybdenum, and the third interlayer comprises iron and is disposed on the second interlayer that comprises nickel. The first interlayer has a selected composition comprising molybdenum, which has a maximum solid solubility within the first material substrate comprising the titanium-based alloy that is greater than or equal to the solubility of the other interlayers (comprising nickel and iron) within the first material substrate comprising the titanium-based alloy. Likewise, the third interlayer (or last interlayer) has a selected composition comprising iron, which has a maximum solid solubility within the composition of the second material substrate comprising the iron-based alloy that is greater than or equal to the solubility of the other interlayers (comprising molybdenum and nickel) within the second material substrate comprising the iron-based alloy. Although the first interlayer, the second interlayer, and the third interlayer are shown as being disposed on the first metal substrate, the first interlayer, the second interlayer, and the third interlayer may alternatively be disposed on the second metal substrate, or the interlayers may be disposed on both the first metal substrate and the second metal substrate in various permutations.

Figure 12:
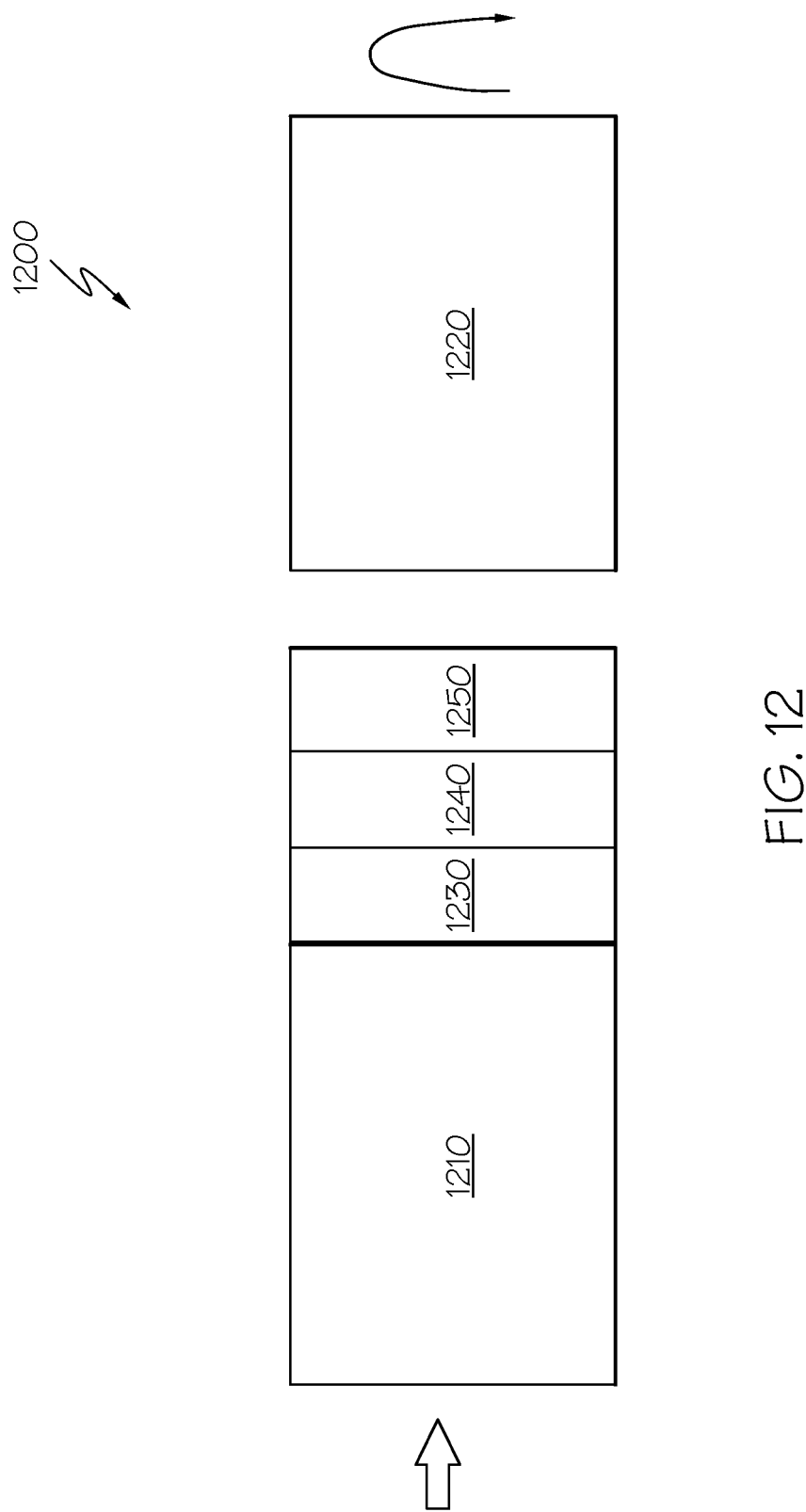
FIG. 12 is a side view of yet another exemplary interlayered structure for joining titanium-based components with iron-based components according to an embodiment of the present description.

FIG. 12 illustrates an exemplary interlayered structure 1200 for joining titanium-based components with iron-based components. The interlayered structure 1200 includes: a first metal substrate 1210 comprising a titanium-based alloy; a second metal substrate 1220 comprising an iron-based alloy; a first interlayer 1230 disposed between the first metal substrate and the second metal substrate, the first interlayer comprising vanadium; a second interlayer 1240 disposed between the first interlayer and the second metal substrate, the second interlayer comprising chromium; and a third interlayer 1250 comprising iron, the third interlayer disposed between the second interlayer and the second metal substrate. By way of selecting the first interlayer to comprise vanadium, the second interlayer to comprise chromium, and the third interlayer to comprise iron, the formation of deleterious phases at the interface between the first metal substrate and the second metal substrate can be prevented or minimized. In this exemplary embodiment, the first interlayer comprises vanadium and is disposed directly on the titanium of the first metal substrate, the second interlayer comprises chromium and is disposed directly on the first interlayer that comprises vanadium, and the third interlayer comprises iron and is disposed on the second interlayer that comprises chromium. The first interlayer has a selected composition comprising vanadium, which has a maximum solid solubility within the first material substrate comprising the titanium-based alloy that is greater than or equal to the solubility of the other interlayers (comprising chromium and iron) within the first material substrate comprising the titanium-based alloy. Likewise, the third interlayer (or last interlayer) has a selected composition comprising iron, which has a maximum solid solubility within the composition of the second material substrate comprising the iron-based alloy that is greater than or equal to the solubility of the other interlayers (comprising vanadium and chromium) within the second material substrate comprising the iron-based alloy. Although the first interlayer, the second interlayer, and the third interlayer are shown as being disposed on the first metal substrate, the first interlayer, the second interlayer, and the third interlayer may alternatively be disposed on the second metal substrate, or the interlayers may be disposed on both the first metal substrate and the second metal substrate in various permutations.

Figure 13:
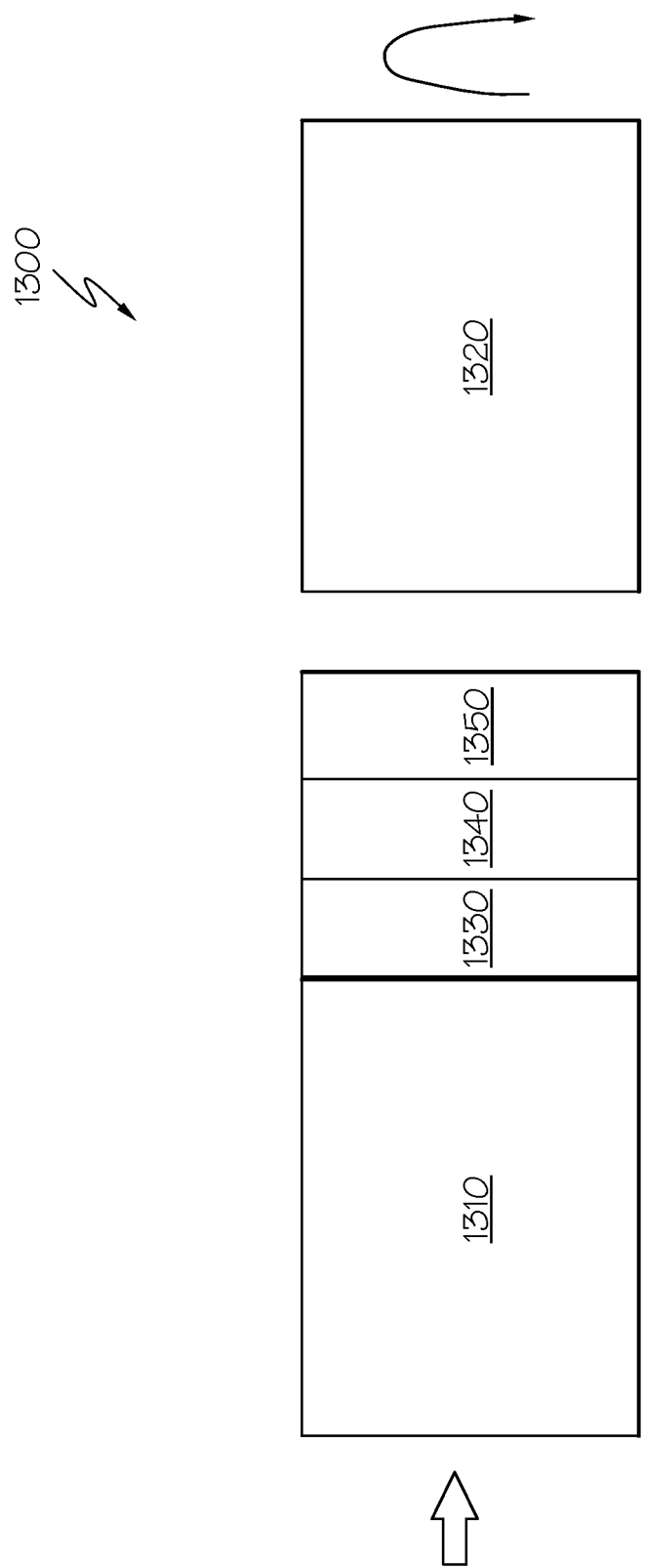
FIG. 13 is a side view of yet another exemplary interlayered structure for joining titanium-based components with iron-based components according to an embodiment of the present description.

FIG. 13 illustrates an exemplary interlayered structure 1300 for joining titanium-based components with iron-based components. The interlayered structure 1300 includes: a first metal substrate 1310 comprising a titanium-based alloy; a second metal substrate 1320 comprising an iron-based alloy; a first interlayer 1330 disposed between the first metal substrate and the second metal substrate, the first interlayer comprising vanadium; a second interlayer 1340 disposed between the first interlayer and the second metal substrate, the second interlayer comprising nickel; and a third interlayer 1350 comprising iron, the third interlayer disposed between the second interlayer and the second metal substrate. In this exemplary embodiment, the first interlayer comprises vanadium and is disposed directly on the titanium of the first metal substrate, the second interlayer comprises nickel and is disposed directly on the first interlayer that comprises vanadium, and the third interlayer comprises iron and is disposed on the second interlayer that comprises nickel. The first interlayer has a selected composition comprising vanadium, which has a maximum solid solubility within the first material substrate comprising the titanium-based alloy that is greater than or equal to the solubility of the other interlayers (comprising nickel and iron) within the first material substrate comprising the titanium-based alloy. Likewise, the third interlayer (or last interlayer) has a selected composition comprising iron, which has a maximum solid solubility within the composition of the second material substrate comprising the iron-based alloy that is greater than or equal to the solubility of the other interlayers (comprising vanadium and nickel) within the second material substrate comprising the iron-based alloy. By way of selecting the first interlayer to comprise vanadium, the second interlayer to comprise nickel, and the third interlayer to comprise iron, the formation of deleterious phases at the interface between the first metal substrate and the second metal substrate can be prevented or minimized. Although the first interlayer, the second interlayer, and the third interlayer are shown as being disposed on the first metal substrate, the first interlayer, the second interlayer, and the third interlayer may alternatively be disposed on the second metal substrate, or the interlayers may be disposed on both the first metal substrate and the second metal substrate in various permutations.

Figure 14:
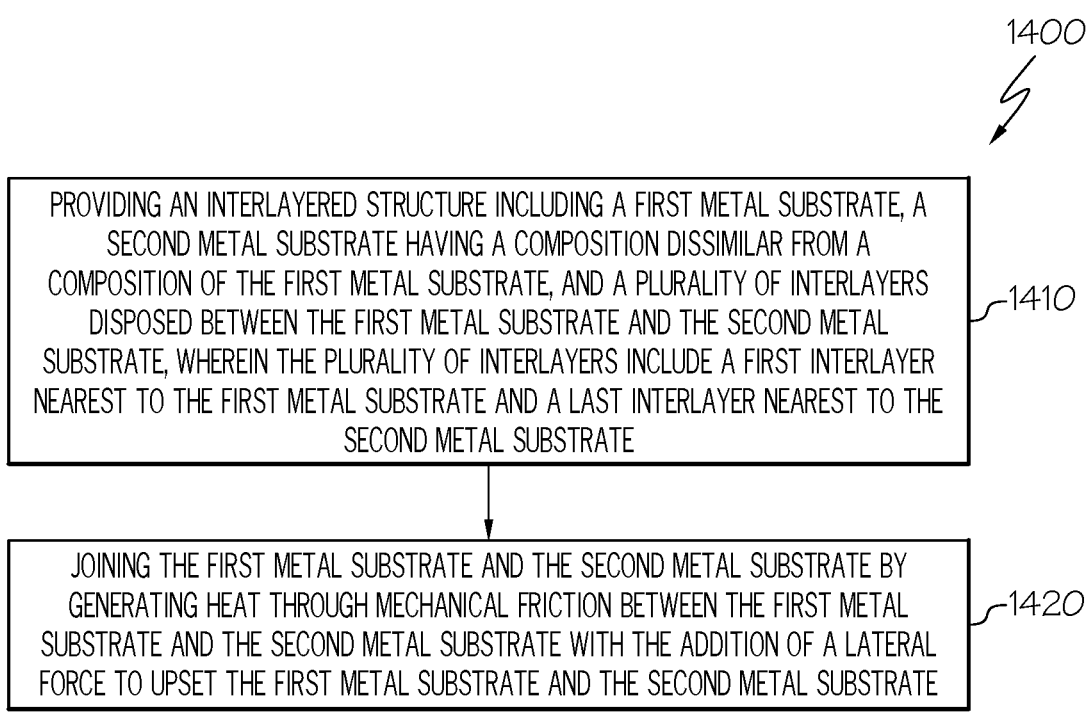
FIG. 14 is a side view of yet another exemplary interlayered structure for joining titanium-based components with iron-based components according to an embodiment of the present description.

FIG. 14 represents a method for joining dissimilar metals 1400 including, at block 1410, providing an interlayered structure including a first metal substrate, a second metal substrate having a composition dissimilar from a composition of the first metal substrate, and a plurality of interlayers disposed between the first metal substrate and the second metal substrate, wherein the plurality of interlayers include a first interlayer nearest to the first metal substrate and a last interlayer nearest to the second metal substrate, and, at block 1420, joining the first metal substrate and a second metal substrate by generating heat through mechanical friction between the first metal substrate and the second metal substrate with the addition of a lateral force to upset the first metal substrate and the second metal substrate.

The step of providing an interlayered structure at block 1410 may include providing any of the interlayered structures as previously described above.

The step of joining the first metal substrate and the second metal substrate at block 1420 may include joining by at least one of linear friction welding and inertia friction welding.

In the joining step, a sacrificial portion of the plurality of interlayers may be consumed during the joining step.

The joining step may yield an intermixed interlayer having a thickness of at least 0.0001 inch between the first material substrate and the second material substrate.

As described above, in some aspects, the plurality of interlayers of the interlayered structures described above include one or more sintered powder interlayers. FIGS. 15A to 15D illustrate one exemplary method for providing sintered powder interlayers.

Figure 15B:
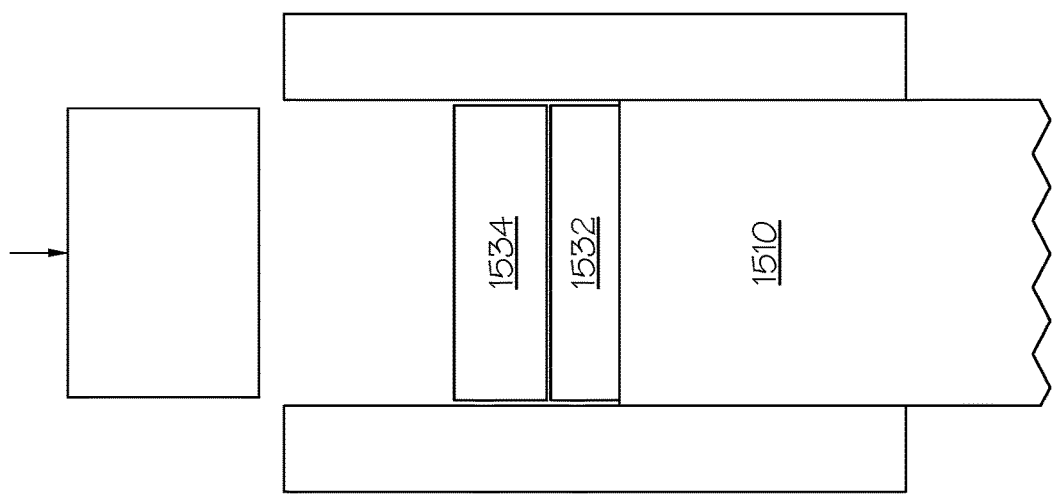
FIGS. 15A to 15D illustrate one exemplary method for providing sintered powder interlayers.
Figure 15A:
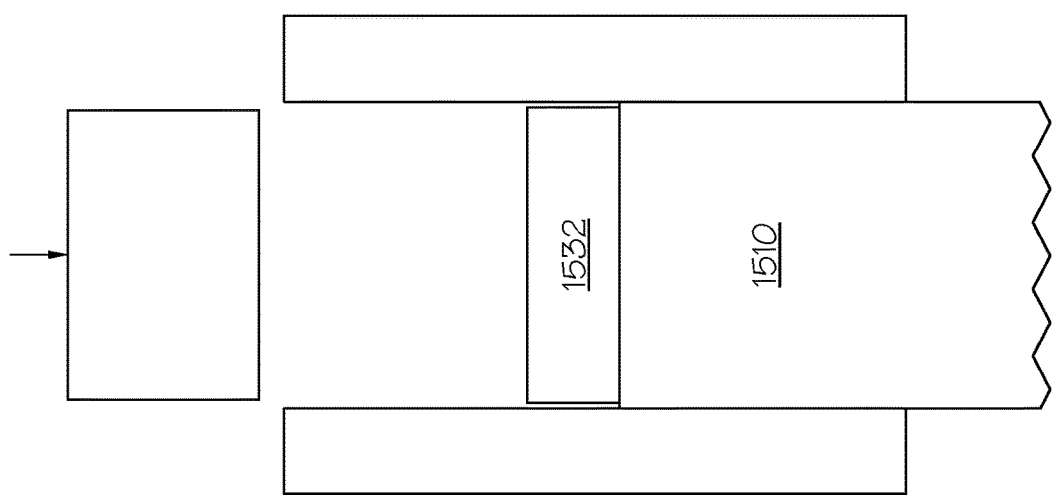
Figure 15D:
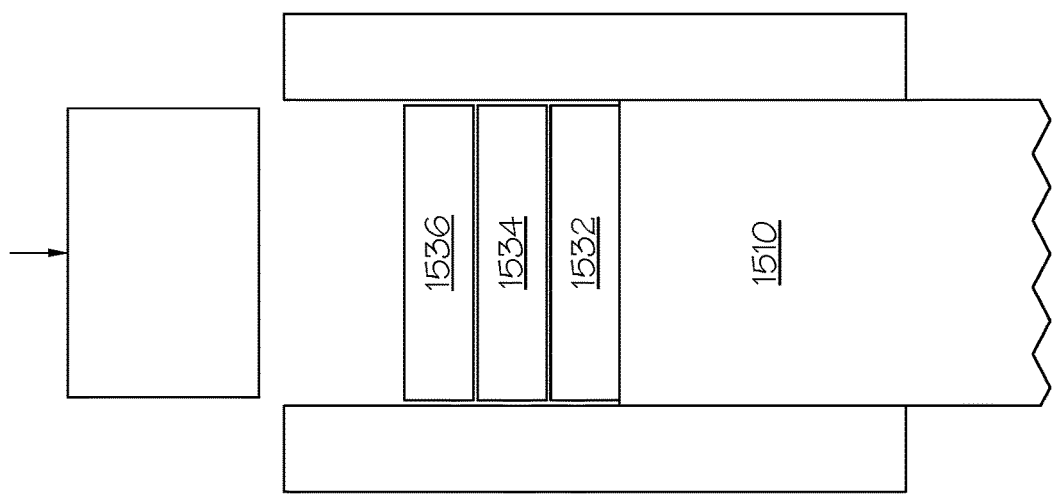

As shown in FIG. 15A, a material substrate 1510 is be positioned in a mold with a first powder layer 1532 thereon. The first powder layer 1532 is compacted to result in the structure of FIG. 15B.

As shown in FIG. 15B, a second powder layer 1534 is provided on the compacted first powder layer 1532. The second powder layer 1534 is compacted to result in the structure of FIG. 15C.

Figure 15C:
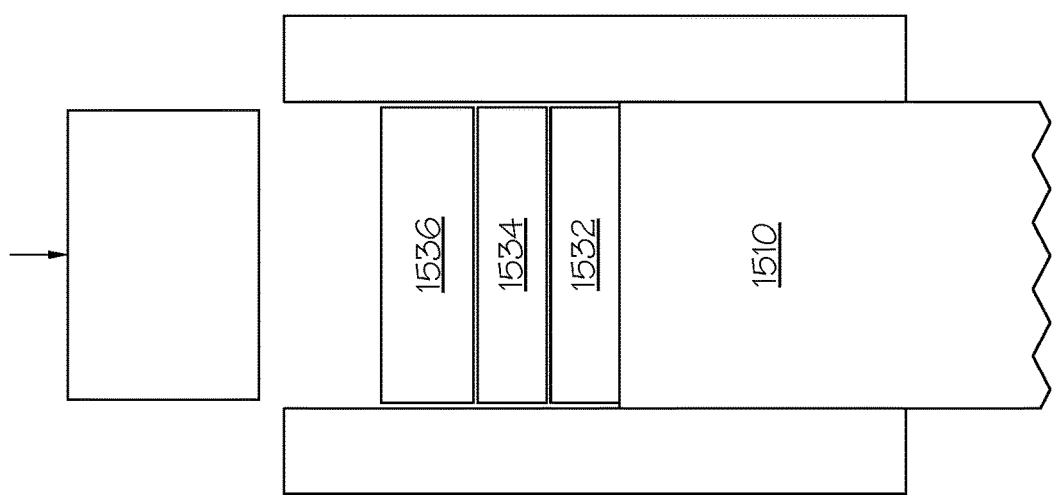

As shown in FIG. 15C, a third powder layer 1536 is provided on the compacted second powder layer 1534. The third powder layer 1536 is compacted to result in the structure of FIG. 15D.

Thereafter, the material substrate 1510 having the compacted first powder layer 1532, the compacted second powder layer 1534, and the compacted third powder layer 1536 thereon is heated to a sintering temperature to sinter the compacted first powder layer 1532, the compacted second powder layer 1534, and the compacted third powder layer 1536.

In a variation, heating steps are added between each of the compacting steps. Thus, the material substrate 1510 having the compacted first powder layer 1534 thereon is heated to a sintering temperature. Then, the second powder layer 1534 is provided on the sintered first powder layer 1532, compacted and sintered. Then, the third powder layer 1536 is provided on the sintered second powder layer 1534, compacted and sintered. In another variation, the compacting and sintering of each respective layer may be performed in a single step.

FIGS. 16A to 16D illustrate another exemplary method for providing sintered powder interlayers.

Figure 16B:
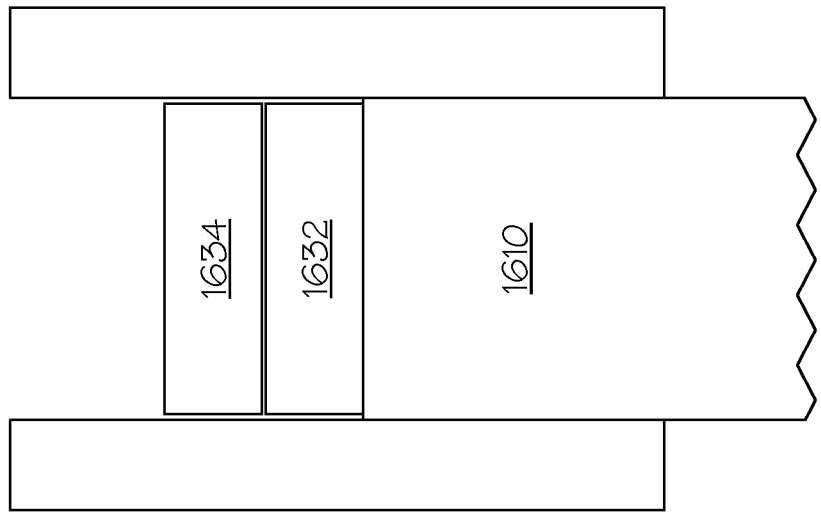
FIGS. 16A to 16D illustrate another exemplary method for providing sintered powder interlayers.
Figure 16A:
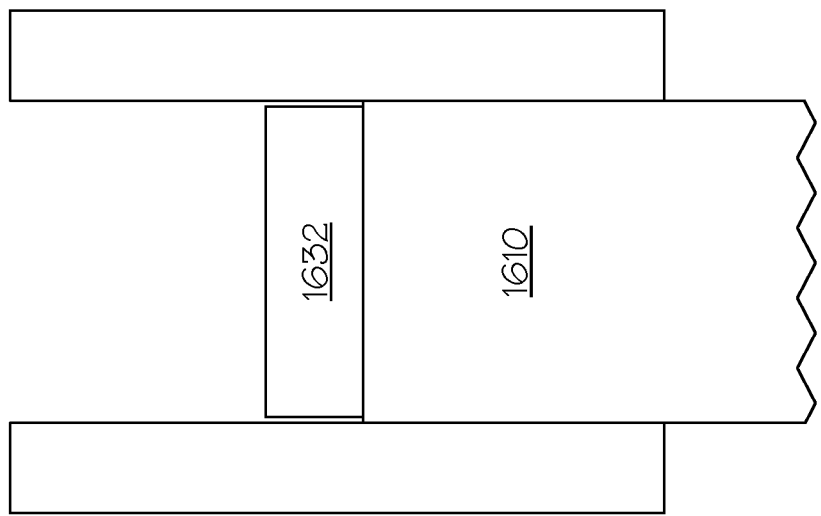

As shown in FIG. 16A, a material substrate 1610 is be positioned in a mold with a first powder layer 1632 thereon.

As shown in FIG. 16B, a second powder layer 1634 is provided on the first powder layer 1632.

Figure 16D:
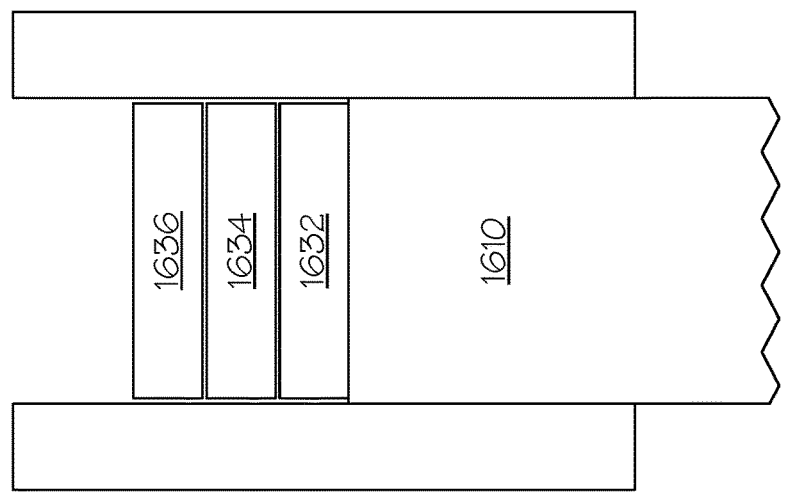
Figure 16C:
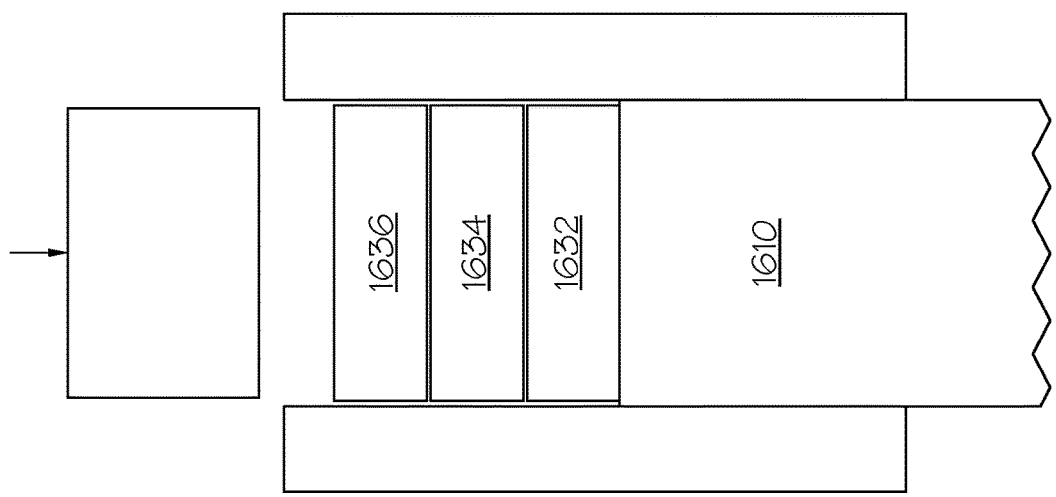

As shown in FIG. 16C, a third powder layer 1636 is provided on the second powder layer 1634.

As shown in FIG. 16D, the material substrate 1610 having the first powder layer 1632, the second powder layer 1634, and the third powder layer 1636 thereon is compacted and then heated to a sintering temperature to sinter the first powder layer 1632, the second powder layer 1634, and the third powder layer 1636. In a variation, the compacting and sintering may be performed in a single step.

With respect to FIGS. 15A to 15D and FIGS. 16A to 16D, it should be understood that the second and third powder layers are optional and are performed when the plurality of interlayers includes two or three sintered powder interlayers. Also, it should be understood that fourth or additional sintered powder interlayers may be added by repeating the above recited steps. Also, it should be understood that each sintered powder interlayers may be made by a different process. In an example, one sintered powder interlayer may be produced by compacting and then sintering, and another sintered powder interlayer may be produced by compacting and sintering in a single step. In another example, two sintered powder interlayers may be compacted and sintered together, and then another sintered powder interlayer may be provided thereon, compacted, and sintered. In yet another example, one or more interlayers may be made by a deposition process, such as a thermal spray process or an additive manufacturing process and one or more additional interlayers may be made by one or more of the above-identified powder metallurgy processes described above.

In another aspect, an optional barrier material may be provided between adjacent interlayers. The barrier material may function to separate powder interlayers, to permit a bonding of the separated interlayers upon heating, or to improve control of a shape of the interface between powder interlayers. For example, the barrier material may have a non-planar shape to provide a resulting non-planar interface between separated powder interlayers.

Examples of barrier materials include a barrier foil, a barrier mesh, and a barrier coating. Material characteristics of the barrier material are not limited. In one aspect, a composition of the barrier material may comprise one or more compositional components in common with the one or both of the compositions of the powder interlayers by the barrier material. In another aspect, the barrier material may consist or consist essentially of one or more components in common with the one or both of the compositions of the powder interlayers separated by the barrier material. In a specific example, the barrier material may have a composition equal to or intermediate to the compositions of the powder interlayers separated by the barrier material.

It should also be understood that any of the variations of the plurality of interlayers with the various compositional combinations may be made by the above-identified processes.

Figure 17:
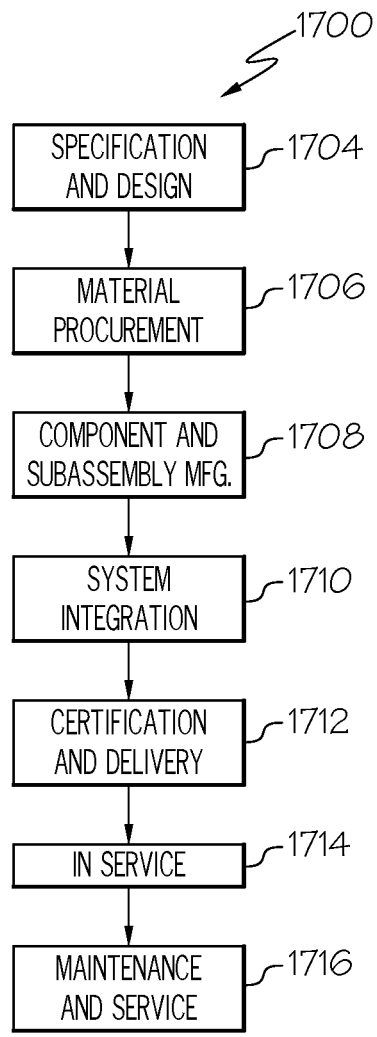
FIG. 17 is flow diagram of an aircraft manufacturing and service methodology.
Figure 18:
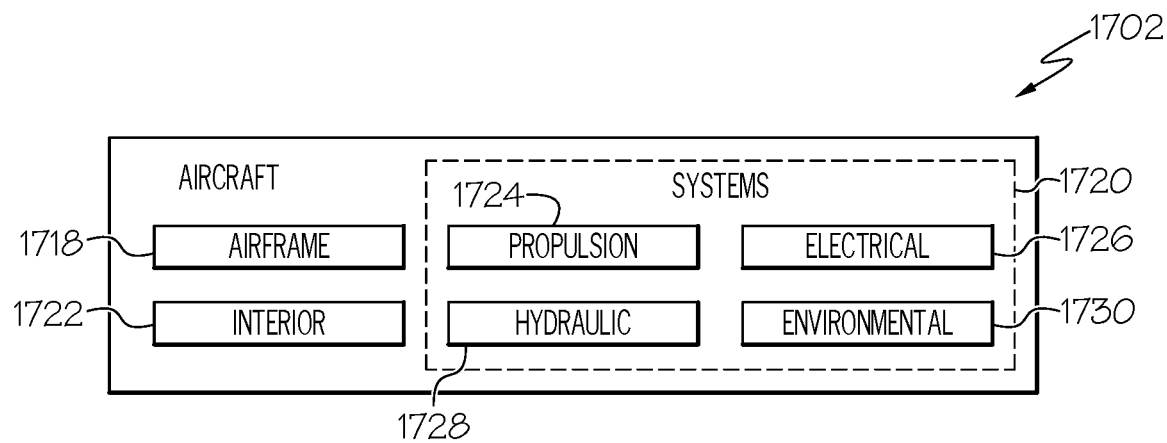
FIG. 18 is a block diagram of an aircraft.

Examples of the present description may be described in the context of an aircraft manufacturing and service method 1700, as shown in FIG. 17, and an aircraft 1702, as shown in FIG. 18. During pre-production, the aircraft manufacturing and service method 1700 may include specification and design 1704 of the aircraft 1702 and material procurement 1706. During production, component/subassembly manufacturing 1708 and system integration 1710 of the aircraft 1702 takes place. Thereafter, the aircraft 1702 may go through certification and delivery 1712 in order to be placed in service 1714. While in service by a customer, the aircraft 1702 is scheduled for routine maintenance and service 1716, which may also include modification, reconfiguration, refurbishment and the like.

Each of the processes of aircraft manufacturing and service method 1700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The disclosed interlayered structures for joining dissimilar materials and methods for joining dissimilar metals may be employed during any one or more of the stages of the aircraft manufacturing and service method 1700.

As shown in FIG. 18, the aircraft 1702 produced by aircraft manufacturing and service method 1700 may include an airframe 1718 with a plurality of systems 1720 and an interior 1722. Examples of the plurality of systems 1720 may include one or more of a propulsion system 1724, an electrical system 1726, a hydraulic system 1728, and an environmental system 1730. Any number of other systems may be included. The disclosed interlayered structures for joining dissimilar materials and methods for joining dissimilar metals may be employed for any of the systems of the aircraft 1702.

The interlayered structures for joining dissimilar materials and methods for joining dissimilar metals are described in the context of an aircraft; however, one of ordinary skill in the art will readily recognize that the disclosed interlayered structures for joining dissimilar materials and methods for joining dissimilar metals may be utilized for a variety of vehicles and non-vehicles.

The following are provided in accordance with various aspects and embodiments of the present disclosure:

A1. An interlayered structure for joining of dissimilar materials, comprising: a first material substrate; a second material substrate having a composition dissimilar from a composition of the first material substrate; and a plurality of interlayers disposed between the first material substrate and the second material substrate, including a first interlayer nearest to the first material substrate and a last interlayer nearest to the second material substrate, wherein the first interlayer has a composition selected to have a maximum solid solubility within the composition of the first material substrate that is greater than or equal to the other interlayers' solubility within the composition of the first material substrate, wherein the last interlayer has a composition selected to have a maximum solid solubility within the composition of the second material substrate that is greater than or equal to the other interlayers' solubility within the composition of the second material substrate, and wherein at least one of the plurality of interlayers is a sintered powder interlayer.

A2. The interlayered structure of A1 wherein the first interlayer has a composition selected to have a maximum solid solubility within the composition of the first material substrate that is greater than the last interlayer within the composition of the first material substrate, and wherein the last interlayer has a composition selected to have a maximum solid solubility within the composition of the second material substrate that is greater than the first interlayer within the composition of the second material substrate.

A3. The interlayered structure of any one of A1 to A2 wherein the plurality of interlayers includes a second interlayer between the first interlayer and the last interlayer, wherein the second interlayer has a composition selected to have a maximum solid solubility within the composition of the first material substrate that is greater than the last interlayer within the composition of the first material substrate and to have a maximum solid solubility within the composition of the second material substrate that is greater than the first interlayer within the composition of the second material substrate.

A4. The interlayered structure of any one of A1 to A3 wherein the plurality of interlayers are disposed on at least one of the first material substrate and the second material substrate.

A5. The interlayered structure of any one of A1 to A4 wherein the plurality of interlayers each have a thickness of at least 0.001 inch.

A6. The interlayered structure of any one of A1 to A5 wherein the plurality of interlayers include two or more elemental layers that respectively comprise one of chromium, nickel, vanadium, molybdenum, iron, and combinations thereof.

A7. The interlayered structure of any one of A1 to A6 wherein the plurality of interlayers are sintered powder interlayers.

B1. An interlayered structure for joining of titanium-based components with iron-based components, comprising: a first metal substrate comprising titanium; a second metal substrate comprising iron; a first interlayer disposed between the first metal substrate and the second metal substrate, the first interlayer comprising at least one of molybdenum and vanadium; and a second interlayer disposed between the first interlayer and the second metal substrate, the second interlayer comprising at least one of chromium and nickel, and wherein at least one of the first interlayer and the second interlayer is a sintered powder interlayer.

B2. The interlayered structure of B1 wherein the first interlayer and the second interlayer are sintered powder interlayers.

B3. The interlayered structure of B2 wherein the first sintered powder interlayer comprises vanadium and the second sintered powder interlayer comprises chromium.

B4. The interlayered structure of B3 further comprising a third sintered powder interlayer disposed between the second sintered powder interlayer and the second metal substrate, wherein the third sintered powder interlayer comprises iron.

B5. The interlayered structure of B4 wherein the second metal substrate comprises steel.

B6. The interlayered structure of any one of B1 to B5 wherein the first interlayer comprises molybdenum.

B7. The interlayered structure of B6 wherein the first interlayer consists of molybdenum and up to 5% of other elements.

B8. The interlayered structure of any one of B1 to B5 wherein the first interlayer comprises vanadium.

B9. The interlayered structure of B8 wherein the first interlayer consists of vanadium and up to 5% of other elements.

B10. The interlayered structure of any one of B1 to B5 wherein the first interlayer comprises molybdenum and vanadium.

B11. The interlayered structure of B10 wherein the first interlayer consists of molybdenum, vanadium and up to 5% of other elements.

B12. The interlayered structure of any one of B1 to B11 wherein the second interlayer comprises chromium.

B13. The interlayered structure of B12 wherein the second interlayer consists of chromium and up to 5% of other elements.

B14. The interlayered structure of any one of B1 to B11 wherein the second interlayer comprises nickel.

B15. The interlayered structure of B14 wherein the second interlayer consists of nickel and up to 5% of other elements.

B16. The interlayered structure of any one of B1 to B11 wherein the second interlayer comprises chromium and nickel.

B17. The interlayered structure of B16 wherein the second interlayer consists of chromium, nickel and up to 5% of other elements.

B18. The interlayered structure of any one of B1 to B17 wherein the first interlayer has a thickness of at least 0.001 inch.

B19. The interlayered structure of any one of B1 to B18 wherein the second interlayer has a thickness of at least 0.001 inch.

B20. The interlayered structure of any one of B1 to B19 wherein the first interlayer and the second interlayer are disposed on the first metal substrate.

B21. The interlayered structure of B20 wherein the first interlayer is disposed directly on the first metal substrate.

B22. The interlayered structure of any one of B20 to B21 wherein the second interlayer is disposed directly on the first interlayer.

B23. The interlayered structure of any one of B1 to B19 wherein the first interlayer and the second interlayer are disposed on the second metal substrate.

B24. The interlayered structure of B23 wherein the second interlayer is disposed directly on the second metal substrate.

B25. The interlayered structure of any one of B23 to B24 wherein the first interlayer is disposed directly on the second interlayer.

B26. The interlayered structure of any one of B1 to B19 further comprising a third interlayer disposed between the second interlayer and the second metal substrate, the third interlayer comprising iron.

B27. The interlayered structure of B26 wherein the third interlayer consists of iron and up to 5% of other elements.

B28. The interlayered structure of any one of B26 to B27 wherein the third interlayer has a thickness of at least 0.001 inch.

B29. The interlayered structure of any one of B26 to B28 wherein the first interlayer, the second interlayer, and the third interlayer are disposed on the first metal substrate.

B30. The interlayered structure of B29 wherein the first interlayer is disposed directly on the first metal substrate.

B31. The interlayered structure of any one of B29 to B30 wherein the second interlayer is disposed directly on the first interlayer.

B32. The interlayered structure of any one of B29 to B31 wherein the third interlayer is disposed directly on the second interlayer.

B33. The interlayered structure of any one of B26 to B28 wherein the first interlayer, the second interlayer, and the third interlayer are disposed on the second metal substrate.

B34. The interlayered structure of B33 wherein the third interlayer is disposed directly on the first metal substrate.

B35. The interlayered structure of any one of B33 to B34 wherein the second interlayer is disposed directly on the third interlayer.

B36. The interlayered structure of any one of B33 to B35 wherein the first interlayer is disposed directly on the second interlayer.

B37. The interlayered structure of B1 wherein the first metal substrate comprises a titanium-based alloy and the second metal substrate comprises an iron-based alloy.

B38. The interlayered structure of B37 wherein the first interlayer comprises vanadium, and the second interlayer comprises chromium.

B39. The interlayered structure of B38 further comprising a third interlayer disposed between the second interlayer and the second metal substrate, the third interlayer comprising iron.

B40. The interlayered structure of B39 wherein the third interlayer comprising iron is disposed directly on the iron-based alloy of the second metal substrate, the second interlayer comprising chromium is disposed directly on the third interlayer comprising iron, and the first interlayer comprises vanadium is disposed directly on the second interlayer that comprises chromium.

B41. The interlayered structure of B37 wherein the first interlayer comprises vanadium and is disposed directly on the titanium of the first metal substrate.

B42. The interlayered structure of B41 wherein the second interlayer comprises chromium and is disposed directly on the first interlayer that comprises vanadium.

B43. The interlayered structure of B42, further comprising a third interlayer disposed directly on the second interlayer that comprises chromium, the third interlayer comprising iron.

B44. The interlayered structure of any one of B39, B40, and B43 wherein the third interlayer is a sintered powder interlayer.

C1. A method for joining dissimilar metals, comprising: providing an interlayered structure, comprising: a first metal substrate; a second metal substrate having a composition dissimilar from a composition of the first metal substrate; and a plurality of interlayers disposed between the first metal substrate and the second metal substrate, including a first interlayer nearest to the first metal substrate and a last interlayer nearest to the second metal substrate, wherein the first interlayer has a composition selected to have a maximum solid solubility within the composition of the first material substrate that is greater than or equal to the other interlayers within the composition of the first material substrate, wherein the last interlayer has a composition selected to have a maximum solid solubility within the composition of the second material substrate that is greater than or equal to the other interlayers within the composition of the second material substrate, and wherein at least one of the plurality of interlayers is a sintered powder interlayer; and joining the first metal substrate and a second metal substrate by heat of friction derived from relative movement between the first metal substrate and the second metal substrate.

C2. The method of C1 wherein the joining includes at least one of linear friction welding and inertia friction welding.

C3. The method of any one of C1 to C2 further comprising consuming a sacrificial portion of the plurality of interlayers during the joining step.

C4. The method of any one of C1 to C3, wherein the joining step yields an intermixed layer having a thickness of at least 0.0001 inches between the first material substrate and the second material substrate.

C5. The method of any one of C1 to C4 wherein the plurality of interlayers are sintered powder interlayers.

Although various embodiments of the disclosed interlayered structures for joining dissimilar materials and methods for joining dissimilar metals have been shown and described, modifications may occur to those skilled in the art upon reading the specification. The present application includes such modifications and is limited only by the scope of the claims.

What is claimed is:

1. An interlayered structure for joining of dissimilar materials by friction welding, comprising:
   a first material substrate;
   a second material substrate having a composition dissimilar from a composition of the first material substrate; and
   a plurality of powder interlayers disposed between the first material substrate and the second material substrate, including a first powder interlayer nearest to the first material substrate and a last powder interlayer nearest to the second material substrate,
   wherein a barrier material is provided between adjacent powder interlayers and functioning to separate the adjacent powder interlayers, the barrier material comprising one or more compositional components in common with one or both of the adjacent powder interlayers separated by the barrier material, the barrier material including a barrier foil, barrier mesh, or barrier coating,
   wherein the first powder interlayer composition is selected to have a maximum solid solubility within the composition of the first material substrate that is greater than or equal to the other powder interlayers' solubility within the composition of the first material substrate,
   wherein the last powder interlayer composition is selected to have a maximum solid solubility within the composition of the second material substrate that is greater than or equal to the other powder interlayers' solubility within the composition of the second material substrate, and
   wherein the first material substrate is unjoined with the second material substrate, and wherein the first material substrate and second material substrate are capable of being joined by friction welding.

2. The interlayered structure of claim 1 wherein the plurality of powder interlayers each have a thickness of at least 0.001 inch.

3. The interlayered structure of claim 1 wherein the plurality of powder interlayers include two or more layers that respectively comprise one of chromium, nickel, vanadium, molybdenum, iron, and combinations thereof.

4. An interlayered structure for joining of titanium-based components with steel-based components by friction welding, comprising:
   a first metal substrate comprising titanium;
   a second metal substrate comprising steel;
   a first powder interlayer disposed between the first metal substrate and the second metal substrate, the first powder interlayer comprising at least one of molybdenum and vanadium; and
   a second powder interlayer disposed between the first powder interlayer and the second metal substrate, the second powder interlayer comprising at least one of chromium and nickel,
   wherein the first metal substrate is unjoined with the second metal substrate, and wherein the first metal substrate and second metal substrate are capable of being joined by friction welding, and
   wherein the second powder interlayer is adjacent the first powder interlayer, and wherein a barrier material coating is provided between the first and second powder interlayers and functions to separate the first and second powder interlayers, the barrier material coating comprising one or more compositional components in common with the first and second powder interlayers separated by the barrier material coating.

5. The interlayered structure of claim 4 wherein the first powder interlayer comprises vanadium and the second powder interlayer comprises chromium.

6. The interlayered structure of claim 5 further comprising a third powder interlayer disposed between the second powder interlayer and the second metal substrate, wherein the third powder interlayer comprises iron.

7. The interlayered structure of claim 4 wherein the first powder interlayer comprises molybdenum.

8. The interlayered structure of claim 4 wherein the first powder interlayer comprises vanadium.

9. The interlayered structure of claim 4 wherein the second powder interlayer comprises chromium.

10. The interlayered structure of claim 4 wherein the second powder interlayer comprises nickel.

11. The interlayered structure of claim 4 further comprising a third powder interlayer disposed between the second powder interlayer and the second metal substrate, the third powder interlayer comprising iron.

12. A method for joining dissimilar metals, comprising:
providing the interlayered structure of claim 4;
sintering the plurality of powder interlayers; and
joining the first metal substrate and the second metal substrate by heat of friction derived from relative movement between the first metal substrate and the second metal substrate having the sintered plurality of powder interlayers therebetween.

13. The interlayered structure of claim 1 wherein the plurality of powder interlayers each have a thickness of at least 0.01 inch.

14. The method of claim 12 wherein the plurality of powder interlayers each have a thickness of at least 0.001 inch.

15. The interlayered structure of claim 1 wherein the first and last powder interlayers each have a thickness of at least 0.001 inch.

16. The interlayered structure of claim 4 wherein the plurality of powder interlayers have a total thickness in a range of 0.01 to 1.0 inch.

17. A method for joining dissimilar materials, comprising:
providing the interlayered structure of claim 1;
sintering the plurality of powder interlayers; and
joining the first material substrate and the second material substrate by heat of friction derived from relative movement between the first material substrate and the second material substrate having the sintered plurality of powder interlayers therebetween.

18. The method of claim 17 wherein the plurality of powder interlayers include two or more layers that respectively comprise one of chromium, nickel, vanadium, molybdenum, iron, and combinations thereof.

19. The method of claim 17 wherein the plurality of powder interlayers each have a thickness of at least 0.001 inch.

20. The method of claim 17 wherein the plurality of powder interlayers have a total thickness in a range of 0.01 to 1.0 inch.

* * * * *